US007158932B1

(12) United States Patent
Furuta

(10) Patent No.: US 7,158,932 B1
(45) Date of Patent: Jan. 2, 2007

(54) NOISE SUPPRESSION APPARATUS

(75) Inventor: Satoru Furuta, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1136 days.

(21) Appl. No.: 09/599,367

(22) Filed: Jun. 21, 2000

(30) Foreign Application Priority Data

Nov. 10, 1999 (JP) ................................ 11-319126

(51) Int. Cl.
*G10L 3/02* (2006.01)
*H04B 15/00* (2006.01)

(52) U.S. Cl. ..................... 704/226; 381/94.2; 381/94.3

(58) Field of Classification Search ............... 381/94.1, 381/94.2, 94.3; 704/226, 200, 201, 227, 704/228, 233

See application file for complete search history.

(56) References Cited

U.S. PATENT DOCUMENTS

| | | | | |
|---|---|---|---|---|
| 4,811,404 | A * | 3/1989 | Vilmur et al. | 381/94.3 |
| 5,668,927 | A * | 9/1997 | Chan et al. | 704/240 |
| 5,687,285 | A * | 11/1997 | Katayanagi et al. | 704/226 |
| 5,742,927 | A * | 4/1998 | Crozier et al. | 704/226 |
| 5,757,937 | A * | 5/1998 | Itoh et al. | 381/94.3 |
| 5,812,970 | A * | 9/1998 | Chan et al. | 704/226 |
| 6,032,114 | A * | 2/2000 | Chan | 704/226 |
| 6,477,489 | B1 * | 11/2002 | Lockwood et al. | 704/200.1 |
| 6,671,667 | B1 * | 12/2003 | Chandran et al. | 704/233 |
| 7,043,030 | B1 * | 5/2006 | Furuta | 381/94.1 |

FOREIGN PATENT DOCUMENTS

| | | |
|---|---|---|
| EP | 0 683 482 | 11/1995 |
| FR | 2 768 547 | 3/1999 |
| JP | 8-506427 | 7/1996 |
| JP | 8-221093 | 8/1996 |
| JP | 9-212196 | 8/1997 |
| JP | 11-162240 | 6/1999 |
| WO | WO 94/18666 | 8/1994 |

OTHER PUBLICATIONS

B. L. Sim, et al., IEEE Transactions on Speech and Audio Processing, vol. 6, No. 4, pp. 328-336, XP-000785363, "A Parametric Formulation of the Generalized Spectral Subtraction Method", Jul. 1, 1999.

L. Arslan, et al., Acoustics, Speech, and Signal Processing, pp. 812-815, XP-010151342, "New Methods for Adaptive Noise Suppression", May 9, 1995.

R. Le Bouquin, Speech Communication, Elsevier Science Publishers, vol. 18, No. 1, pp. 3-19, XP-004008920, "Enhancement of Noisy Speech Signals: Application to Mobile Radio Communications", 1996.

Steven F. Boll, "Suppression of Acoustic Noise in Speech Using Spectral Subtraction," IEEE Transactions on Acoustics, Speech, and Signal Processing, vol. ASSP-27, No. 2, Apr. 1979, pp. 113-120.

* cited by examiner

*Primary Examiner*—Xu Mei
(74) *Attorney, Agent, or Firm*—Oblon, Spivak, McClelland, Maier & Neustadt, P.C.

(57) ABSTRACT

In the noise suppression apparatus, a spectrum correction gain calculation unit calculates the noise amplitude spectrum correction gain and the noise removal spectrum correction gain using the input amplitude spectrum, noise amplitude spectrum and respective coefficients; a spectrum deduction unit deducts the product of the noise amplitude spectrum and the noise amplitude spectrum correction gain from the input amplitude spectrum and outputs the result as a first noise removal spectrum; a spectrum suppression unit multiplies the first noise removal spectrum by the noise removal spectrum correction gain and outputs the result as a second noise removal spectrum; finally a frequency/time conversion unit converts the second noise removal spectrum into a time domain signal.

17 Claims, 10 Drawing Sheets

NOISE SUPPRESSION APPARATUS

FIELD OF THE INVENTION

The present invention relates to a noise suppression apparatus for use in a system, such as a voice communication system or a voice recognition system used in various noise circumstances, for suppressing noises, other than an object signal.

BACKGROUND OF THE INVENTION

A noise suppression apparatus for suppressing non-object signals, for example, noises superimposed on voice signals is disclosed, for example, in Japanese Patent Application Laid-Open (JP-A) No. 8-221093. The theoretical grounds of the apparatus disclosed therein is the so-called Spectral Subtraction Method (SS method), which focuses on the amplitude spectrum. This method is introduced in document 1 (Steven F. Boll, "Suppression of Acoustic noise in speech using spectral subtraction", IEEE Trans. ASSP, Vol. ASSP-27, No. 2, April 1979).

The conventional noise suppression apparatus disclosed in JP-A No. 8-221093 is explained below, referring to FIG. 13. In FIG. 13, reference numeral 101 denotes a framing processing unit, 102 denotes a windowing processing unit and 103 denotes a Fast Fourier Transformation processing unit. Reference numeral 104 denotes a band dividing unit, 105 denotes a noise estimation unit, 106 denotes an NR value calculation unit, 107 denotes an Hn value calculation unit, 108 denotes a filter processing unit, 109 denotes a band conversion unit, 110 denotes a spectrum correction unit, 111 denotes an inverse Fast Fourier Transformation processing unit, 112 denotes an overlap adding unit, 113 denotes a voice signal input terminal, 114 denotes a voice signal output terminal, and 115 denotes an output signal terminal. Inside the noise estimation unit 105, reference numeral 121 denotes an RMS calculation unit, 122 denotes a relative energy calculation unit, 123 denotes a maximum RMS calculation unit, 124 denotes an estimated noise level calculation unit, 125 denotes a maximum SNR calculation unit and 126 denotes a noise spectrum estimation unit.

The principle of the function of the conventional noise suppression apparatus will be explained below.

An input voice signal y [t], which includes a voice signal component and a noise component is input into the voice signal input terminal 113. The input signal y [t] is a digital signal, which has been sampled under a sampling frequency FS, for example. Then, the signal is sent to the framing processing unit 101 so as to be divided into frames, each of which has a frame length of FL. Thereafter the signal processing is carried out frame by frame.

Prior to the calculation in the Fast Fourier Transformation processing unit 102, each of the framed signal $y_{frame}$ [j, k] sent from the framing processing unit 101 is windowed in the windowing processing unit 102. Here j denotes a sampling number and k denotes a frame number.

The signal undergoes, for example, a 256 points Fast Fourier Transformation in the Fast Fourier Transformation unit 103. The values of the obtained frequency spectrum amplitude are divided into, for example, 18 bands in the band dividing unit 104. The band divided input signal spectrum Y [w, k] is sent to the spectrum correction unit 110 along with the noise spectrum estimation unit 126 and the Hn value calculation unit 107 in the noise estimation unit 105. Here w denotes a band number.

Then, the framed signals $y_{frame}$ [j, k] are discriminated into the voice signal frames and noise frames in the noise estimation unit 105 so that noise like frames are identified. Simultaneously the estimated noise level value and the maximum SNR (Signal to Noise ratio) are sent to the NR calculation unit 106.

The RMS calculation unit 121 calculates the root mean square (RMS) of each signal component in each frame, and outputs the result as an RMS value RMS [k].

The relative energy calculation unit 122 calculates the relative energy of a k-th frame, which relates to the attenuation energy in connection with the former frame, and outputs the result.

The maximum RMS calculation unit 123 obtains a maximum RMS value. The maximum RMS value is necessary for estimating an estimated noise level value described later and a so-called maximum SNR, which is a proportion of the signal level to the estimated noise level. The maximum RMS value is outputted as the maximum RMS value MaxRMS [k].

The estimated noise level calculation unit 124 selects the minimum RMS value among the RMS values of the last five frames of the current frame (local minimum values), to output it as an estimated noise level value MinRMS [k]. The minimum RMS value is preferable to estimate the background noise or the background noise level.

The maximum SNR calculation unit 125 calculates the maximum SNR MaxSNR [k], on the basis of the maximum RMS value MaxRMS [k] and the estimated noise level value MinRMS [k].

The noise spectrum estimation unit 126 calculates a time averaged estimated value N [w, k] of the background noise spectrum, based on RMS value RMS [k], the relative energy, the estimated noise level value MinRMS [k] and the maximum RMS value MaxRMS [k].

The NR value calculation unit 106 calculates the NR [w, k], which is used in avoiding a sudden change of the filter response.

The Hn value calculation unit 107 generates a filter Hn [w, k] for removing the noise signal from the input signal, on the basis of the band divided input signal spectrum Y [w, k], the time averaged estimated value N [w, k] of the noise spectrum and the output NR [w, k] of the NR value calculation unit 106. The filter Hn [w, k] generated in this unit has a response characteristic that the noise suppression increases when the noise component is larger than the voice signal component, and decreases when the voice component is larger than the noise component.

The filter processing unit 108 smoothes the value of the filter Hn [w, k] on the frequency base as well as on the time base. The smoothing on the frequency base is carried out by the median filtering processing. An AP smoothing is carried out on the time base only in voice signal sections and in noise sections, and the smoothing is not carried out for the signals in transient sections.

The band conversion unit 109 carries out an interpolation processing of the value of the band divided filter, which is sent from the filter processing unit 108, so as to adapt it for inputting into the inverse Fast Fourier Transformation unit 111. The spectrum correction unit 110 multiplies the output of the Fast Fourier Transformation unit 103 by the aforementioned interpolated value of the filter so that a spectrum correction processing, in other words, a noise component deduction processing, is carried out. The spectrum correction unit 110 outputs the noise remaining signal.

The inverse Fast Fourier Transformation processing unit 111 carries out the inverse Fast Fourier Transformation, on the basis of the noise deducted signal obtained in the spectrum correction unit 110, and outputs the obtained signal as a signal IFFT. The overlap adding unit 112 carries out an overlap addition of the signal IFFT at the boundary portions of each of the frames. The obtained output voice signal is outputted from the voice signal output terminal 114.

In the aforementioned noise reducing apparatus, the filter removes the noise spectrum from the input spectrum, corresponding to the proportion of the estimated noise signal to the input voice signal (estimated SNR) as well as the noise signal level. The spectral suppression processing is carried out, by controlling the filter characteristic, according to the distribution of the voice signal and the noise signal. The distortion of the object signal is restricted to the minimum and a large suppression of the noises are secured, and thus the aforementioned noise reducing apparatus has some excellent characteristics. However, the conventional apparatus also has the following problems.

Because the grounds of the control are the estimated noise signal level and the estimated SNR, the noise suppression can not be appropriately carried out when the estimation of the estimated noise signal level is not correct. In such a case, signals are excessively suppressed.

In the control of a suppression amount using the estimated noise signal, the estimated noise signal is generated from the average spectrum of the past frames which were identified to be noise signal. Therefore, when the input voice signal level changes suddenly, for example, at the head portion of words in speech, a time-lag occurs in controlling the filter. As a result, one feels that head portion of words in speech is extinguished or hidden, or a strange sound is heard.

SUMMARY OF THE INVENTION

It is an object of the present invention to solve the aforementioned problems, and to provide a noise suppression apparatus which can suppress noises agreeably in hearing, and assure that the quality does not deteriorate even in a noisy circumstance where the noise level is high.

The noise suppression apparatus according to the present invention calculates a noise amplitude spectrum corresponding to the noise likeness of the input signal frame using the input amplitude spectrum of the frame. Then, calculates a noise amplitude spectrum correction gain and a noise removal spectrum correction gain from the already calculated noise amplitude spectrum, input amplitude spectrum and respective coefficients. Then, calculates a first noise removal spectrum by deducting the product of the noise amplitude spectrum and the noise amplitude spectrum correction gain from the input amplitude spectrum. Then, calculates a second noise removal spectrum by multiplying the first noise removal spectrum by the noise removal spectrum correction gain. The second noise removal spectrum is converted into a time domain signal. Thus, it is possible to carry out a suitable spectrum reduction and spectrum amplitude suppression corresponding not only to the noise signal level but also to the input signal level are carried out, even at a section where the input sound signal suddenly changes, for example, at the head portion of words in speech, the impression of extinguishment or hiding of the head portion of the words in speech, due to an excessive spectrum reduction or suppression can be avoided.

Other objects and features of this invention will become apparent from the following description with reference to the accompanying drawings.

DESCRIPTION OF THE PREFERRED EMBODIMENTS

A noise suppression apparatus according to a first embodiment of the present invention will be explained below, referring to the accompanied figures.

Figure 1:
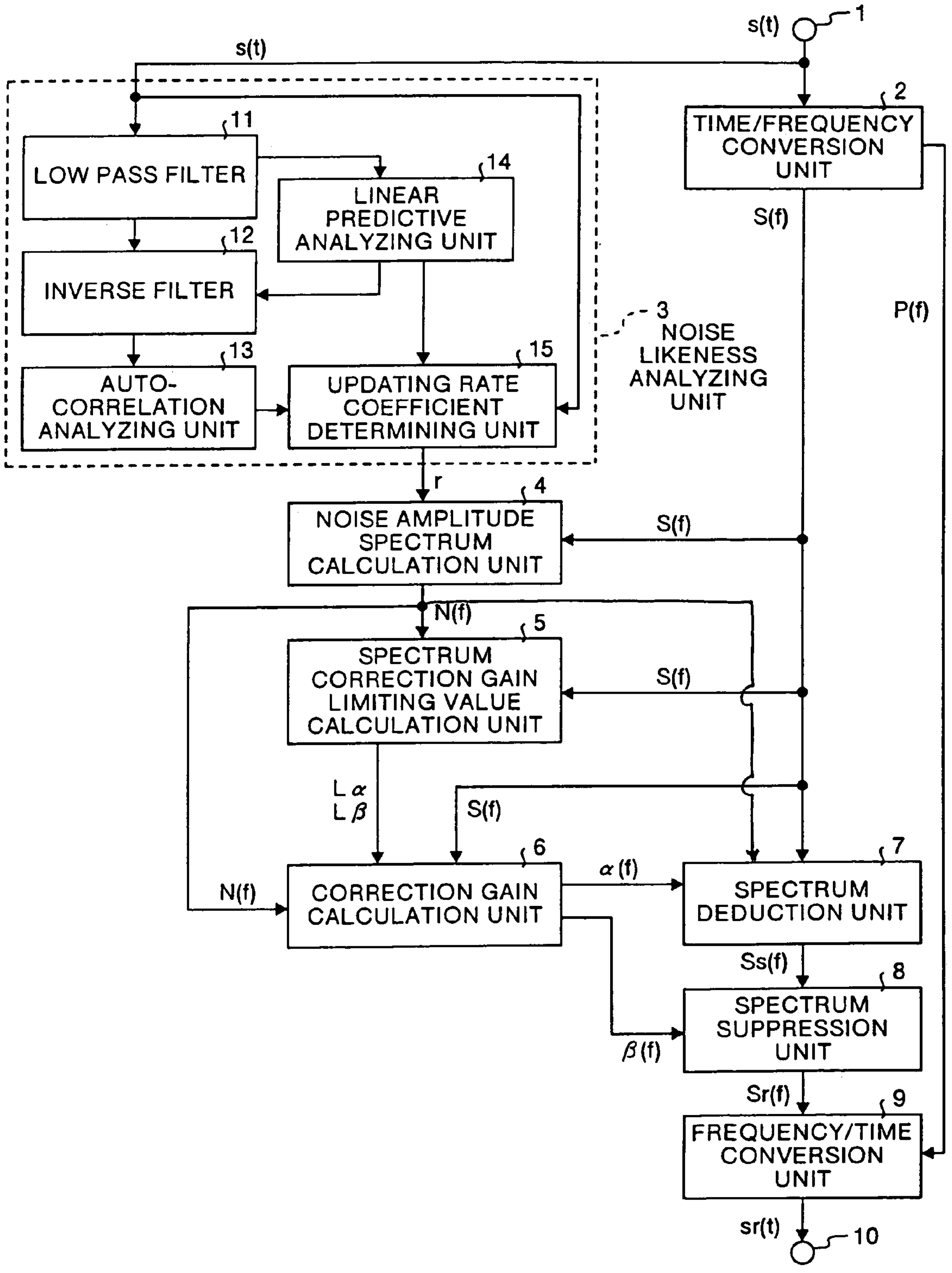
FIG. 1 is a block diagram showing the construction of the noise suppression apparatus according to the first embodiment of the present invention.

FIG. 1 is a block diagram showing the construction of the noise suppression apparatus according to the first embodiment of the present invention. The apparatus comprises input signal terminal 1, time/frequency conversion unit 2, noise likeness analyzing unit 3, noise amplitude spectrum calculation unit 4, spectrum correction gain limiting value calculation unit 5, correction gain calculation unit 6, spectrum deduction unit 7, spectrum suppression unit 8, frequency/time conversion unit 9 and an output signal terminal 10.

In this first embodiment, the spectrum correction gain limiting value calculation unit 5 and the correction gain calculation unit 6 constitute the spectrum correction gain calculation unit.

The principle of the function of the noise suppression apparatus of the present invention will be explained below with reference to FIG. 1.

An input signal s [t], which is sampled at a predetermined sampling frequency (for example, at 8 kHz) and divided into a set of frames having a predetermined length (for example, 20 ms) is input into the input signal terminal 1. The input signal s [t] can be a pure background noise, or it can be a mixture of a voice signal mixed with the background noise.

The time/frequency conversion unit 2 transforms the input signal s [t] into an amplitude spectrum S [f] and a phase spectrum P [f], using a Fast Fourier Transformation, (for example, 256 points FFT). The method of FFT is well known, hence, the explanation of FFT is omitted, here.

The noise likeness analyzing unit 3 comprises linear predictive analyzing unit 14, a low pass filter 11, an inverse filter 12, auto-correlation analyzing unit 13 and updating rate coefficient determining unit 15.

At first, a filtering processing of the input signal is carried out in the low pass filter 11 to obtain a low pass filtered signal. The cut-off frequency of this filter is 2 kHz, for example. As a result of the low pass filtering processing, the influence of noises in the high frequency region is removed, which allows a stable analysis of the input signal.

Then, the linear predictive analyzing unit 14 carries out a linear predictive analysis of the low pass filtered signal to obtain a set of linear predictive coefficients, for example, tenth order a parameters. The inverse filter 12 carries out an inverse filtering processing of the low pass filtered signal, using the set of linear predictive coefficients, to output a low pass linear predictive residual signal (hereinafter called "low pass residual signal"). Subsequently, the auto-correlation analyzing unit 13 carries out the auto-correlation analysis of the low pass residual signal, to obtain a positive peak value $RAC_{max}$.

The updating rate coefficient determining unit 15 calculates the noise likeness level $N_{level}$, on the basis of, for example, the positive peak value $RAC_{max}$, a power Rpow of low pass residual signal of the present frame and a power Fpow in all over the frequency region of the signal of the present frame sent from the input terminal 1. Thereafter the updating rate coefficient determining unit 15 calculates the noise amplitude spectrum updating rate coefficient r, on the basis of the obtained noise likeness level.

The noise likeness $N_{level}$ is determined, on the basis of the values of a $RAC_{max}$, Rpow and Fpow, according to the following rule. Where $RAC_{th}$, $R_{th}$ and $F_{th}$ are, respectively, a threshold value of the maximum of the auto-correlation, a threshold value of the power of the low pass residual signal, and a threshold value of the power in all over the frequency region of the signal of the present frame. Each of them is a predetermined constant value.

start:

$N_{level}$=0;;; the noise likeness level is cleared to zero if ($RAC_{max}$>$RAC_{th}$) $N_{level}$=$N_{level}$+2 if (Rpow>$Rpow_{th}$) $N_{level}$=$N_{level}$+1 if (Fpow>$Fpow_{th}$) $N_{level}$=$N_{level}$+1 output $N_{level}$;;; the noise likeness level is outputted end:

The noise amplitude spectrum updating rate coefficient r is given corresponding to the noise likeness level $N_{level}$, as shown in Table 1. The larger the value of r, the stronger the influence of the input amplitude spectrum of the present frame on a noise amplitude spectrum N [f]. The noise amplitude spectrum N [f] is an average value of the noise spectrum in the past and is explained below.

TABLE 1

| Noise likeness level | Noise level | Updating rate coefficient r |
|---|---|---|
| 0 | Noise level is high | 0.5 |
| 1 | Noise level is high | 0.6 |
| 2 | Noise level is high | 0.8 |
| 3 | Noise level is high | 0.95 |
| 4 | Noise level is low | 0.999 |

The noise amplitude spectrum calculation unit 4 updates the noise amplitude spectrum N [f], on the basis of the noise amplitude spectrum updating rate coefficient r, which is sent from the noise likeness analyzing unit 3, and the input amplitude spectrum S [f] output the time/frequency conversion unit 2, according to equation (1). Where $N_{old}$ [f] and $N_{new}$ [f] denote, respectively, the noise amplitude spectrum before and after the updating. Hereinafter, the noise amplitude spectrum N [f] designates the noise amplitude spectrum $N_{new}$ [f] after the updating.

$$N_{new}[f]=(1-r)\cdot N_{old}[f]+r\cdot S[f] \quad (1)$$

By the way, the initial value of the noise amplitude spectrum N [f] is given, by setting the noise amplitude spectrum updating rate coefficient r in equation (1) to 1.0.

The spectrum correction gain limiting value calculation unit 5 calculates a noise amplitude spectrum correction gain limiting value $L_\alpha$ and a noise removing spectrum correction gain limiting value $L_\beta$, on the basis of the input amplitude spectrum S [f] sent from the time/frequency conversion unit 2 and the noise amplitude spectrum N [f] sent from the noise amplitude spectrum calculation unit 4.

First, the power Ps (dB value) of the input amplitude spectrum S [f] is obtained, according to equation (2).

$$Ps\ (dB)=10\log_{10}(\Sigma(S[f]\cdot S[f])) \quad (2)$$

Next, the power Pn (dB value) of the noise amplitude spectrum N [f] is obtained, according to equation (3). By the way, the value of Pn is limited in a region: $Pn_{MIN}\leqq Pn\leqq 0$. Where $Pn_{MIN}$ designates a minimum value (dB value) of the power of the noise signal and is a predetermined value. The function MAX (a, b) in equation (3) is a function which selects and returns the larger one between its two arguments a and b.

$$Pn\ (dB)=\mathrm{MAX}(-10\log_{10}(\Sigma(N[f]\cdot N[f]), Pn_{MIN}) \quad (3)$$

Subsequently, the SNR $snr_{all}$, which is a proportion of the input signal to the noise signal in all over the frequency range of the present frame, is obtained, on the basis of the values Ps and Pn, according to equation (4).

$$snr_{all}(dB)=Ps+Pn \quad (4)$$

Figure 7:
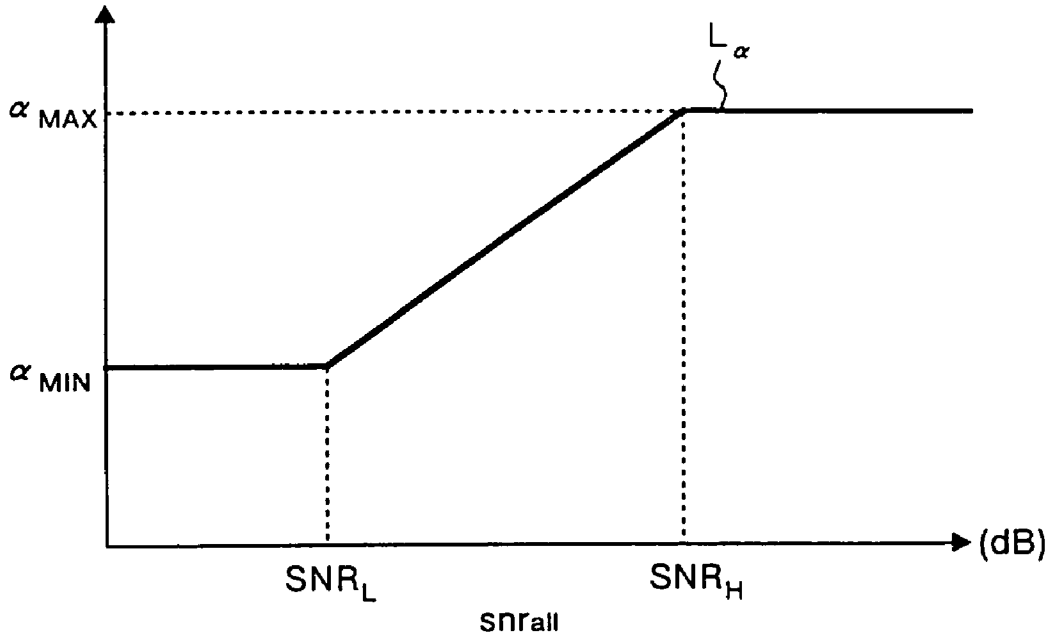
FIG. 7 shows a graph of noise amplitude correction gain limiting value as a function of all frequency band SNR.

Then, the noise amplitude spectrum correction gain limiting value $L_\alpha$ is determined and outputted according to equation (5), on the basis of the all frequency range SNR $snr_{all}$ obtained with equation (4). The quantities $\alpha_{MAX}$ and $\alpha_{MIN}$ in equation (5) represent, respectively, the maximum value (dB) and the minimum value (dB) of the noise amplitude spectrum correction gains. Each of them is a predetermined constant value. And the quantities $SNR_l$ and $SNR_h$ are threshold values regarding the all frequency range SNR. Each of them is a predetermined constant. The quantity $L_\alpha$ is a maximum value limiter, which determines the maximum deduction coefficient at the deduction of noise amplitude spectrum from the input amplitude spectrum, which is carried out in the after-mentioned spectrum deduction unit 7. FIG. 7 show a profile of $L_\alpha$ in equation (5) with respect to $snr_{all}$.

$$L_\alpha = \begin{cases} \alpha_{MAX} & ; snr_{all} >= SNR_h \\ \{(\alpha_{MAX} - \alpha_{MIN})snr_{all} + (SNR_h\alpha_{MIN} + SNR_l\alpha_{MAX})\} & /(SNR_h - SNR_l) \\ & ; SNR_h > snr_{all} >= SNR_l \\ \alpha_{MIN} & ; SNR_l > snr_{all} \end{cases} \quad (5)$$

Subsequently, the difference dPs between the input signal power Ps and a threshold value $Ps_{th}$ is calculated according to equation (6). Where the quantity $Ps_{th}$ is a threshold value of the input signal power and is a predetermined constant value.

$$dPs(dB)=Ps-Ps_{th} \quad (6)$$

Figure 8:
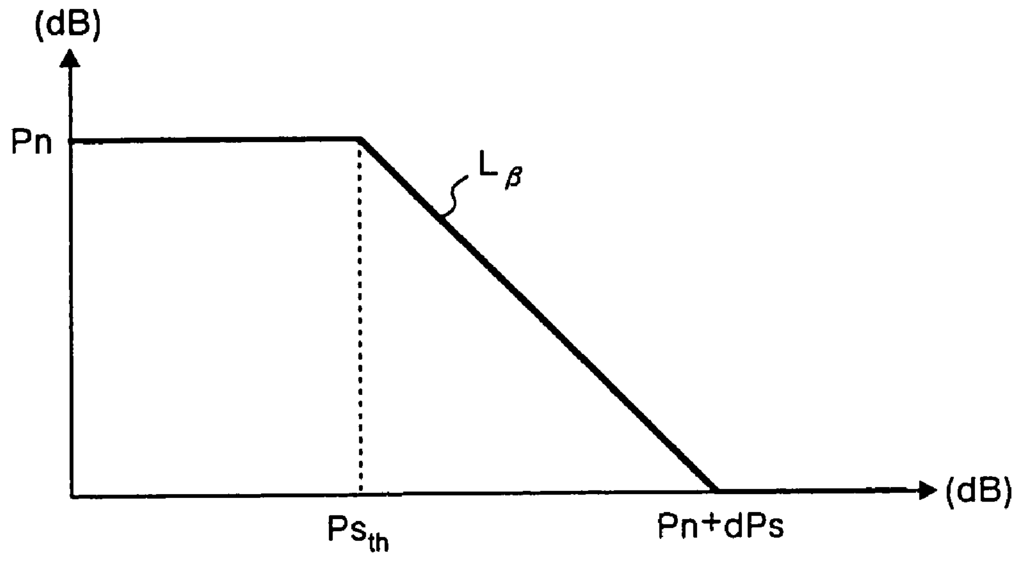
FIG. 8 shows a graph of noise removal spectrum correction gain limiting value as a function of the input signal power.

After calculating the difference dPs between the input signal power and the threshold value, a limiting value $L_\beta$ of the noise removing spectrum correction gain β [f] is determined and outputted, according to equation (7). The quantity $L_\beta$ is a maximum value limiter regarding the amplitude suppressing quantity. The amplitude suppressing is carried out in the after-mentioned spectrum suppression unit. FIG. 8 shows a profile of $L_\beta$ in equation (7) with respect to Ps.

$$L_\beta(dB) = \begin{cases} Pn & dPs < 0 \\ Pn - dP & dPs > 0 \text{ and } Pn - dPs > 0 \\ 0 & pn - dPs > 0 \end{cases} \quad (7)$$

The correction gain calculation unit 6 calculates the noise amplitude spectrum correction gain α [f] and the noise removal spectrum correction gain β [f], on the basis of the input amplitude spectrum S [f], noise amplitude spectrum N [f], noise amplitude spectrum correction gain limiting value $L_\alpha$, and the noise removal spectrum correction gain limiting value Lβ. Using α [f], the noise amplitude spectrum N [f] can be corrected for each frequency component. And using the noise removal spectrum correction gain β [f], the after-mentioned first noise removal spectrum $S_S$ [t] is corrected for each frequency component.

First, SNR $snr_{sp}$ [f], which is a proportion of the input amplitude spectrum to the noise amplitude spectrum, is calculated for each frequency component, according to equation (8). Where the quantity fn is the Nyquist frequency.

$$snr_{sp}[f](dB) = \begin{cases} 20\log_{10}(s[f]/N[f] & \text{if} s[f] > N[f] \\ & f = 0, \ldots, f_n \\ 0 & \text{else} \end{cases} \quad (8)$$

A noise amplitude spectrum correction gain α [f] is calculated according to equation (9), on the basis of SNR $snr_{sp}$ [f] for each frequency component obtained with equation (8), the minimum value $Pn_{MIN}$ of the noise power, the noise amplitude spectrum correction gain limiting value $L_\alpha$ and a phone reception weighting value $W_\alpha$ [f]. Where the minimum value $Pn_{MIN}$ of the noise power is a predetermined constant value in (9). And MIN (a, b) is a function, which returns the smaller one between its two arguments a and b.

$$\text{gain}_\alpha=\text{MIN}(snr_{sp}[f]\cdot W_\alpha[f]+Pn,\ 0)$$

$$\alpha[f]=L_\alpha\cdot\{(Pn_{MIN}+\text{gain}_\alpha)/Pn_{MIN}\} \quad (9)$$

Figure 9:
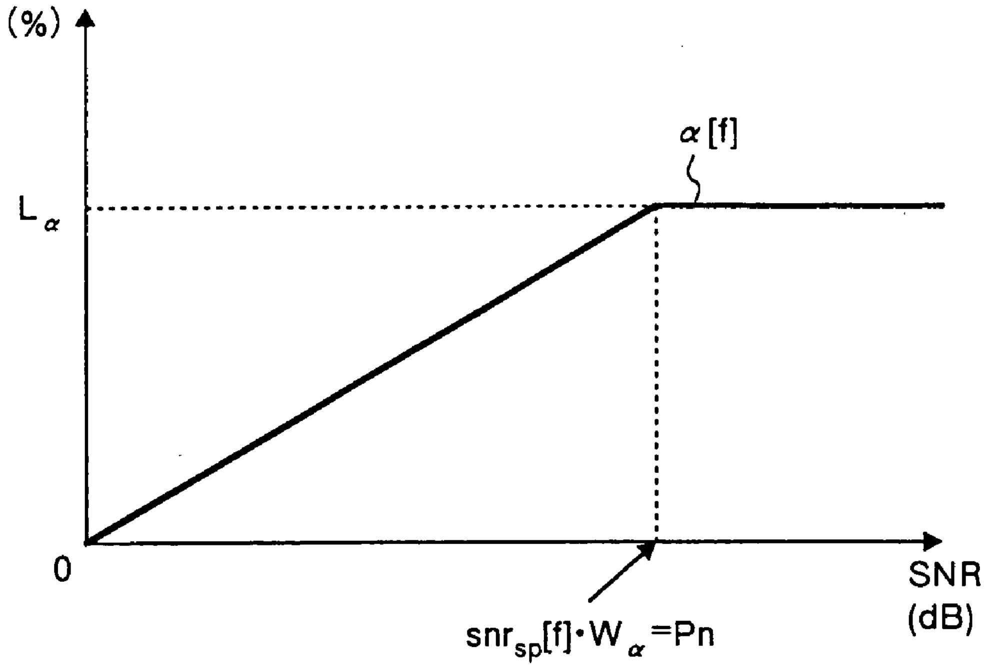
FIG. 9 shows a graph of the noise amplitude correction gain.

According to equation (9), when the value $snr_{sp}$ [f] increases, namely, when the SNR of each of the frequency components increases, the value of the $\text{gain}_\alpha$ increases, as a result, also the noise amplitude spectrum correction gain α [f] increases. Consequently, in the spectrum deduction unit 7, when a spectrum component has a large SNR, the deduction coefficient, which is a proportion of the deduction in the reduction of noise spectrum from the input signal spectrum, increases. On the other hand, when a spectrum component has a small SNR, the corresponding deduction coefficient is small. FIG. 9 shows a profile of a [f] with respect to $snr_{sp}$ [f].

Figure 11:
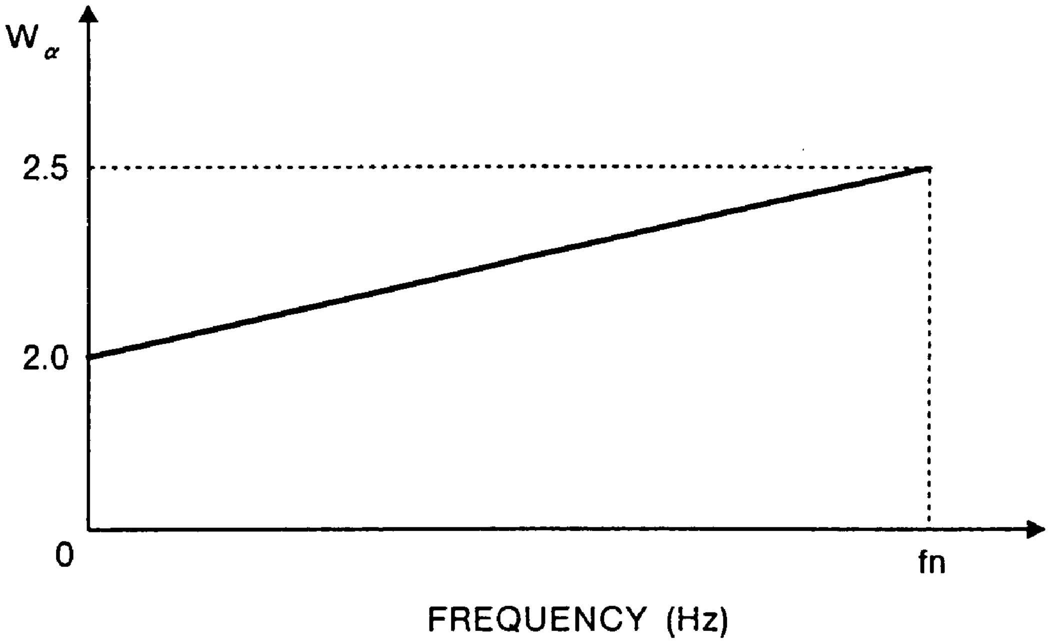
FIG. 11 shows a graph of the phone reception weighting value $W_{\alpha}$ as a function of the noise amplitude spectrum correction gain.

The value of the phone reception weighting value $W_\alpha$ [f] is predetermined according to its parameter, frequency f. And the value of $W_\alpha$ [f] decreases as the frequency increases. As a result of this weighting, the value of α [f] decreases in the high frequency region. Consequently an excessive suppression in the high frequency region can be avoided so that a generation of a strange sound in the frequency region can be avoided. FIG. 11 shows a profile of the $W_\alpha$ [f].

Subsequently, the noise removal spectrum correction gain β [f] is calculated, on the basis of the input amplitude spectrum S [f], the noise amplitude spectrum N [f], a phone reception weighting value $W_\beta$ [f] and a noise removal correction gain limiting value $L_\beta$, according to equation (10). The noise removal spectrum correction gain β [f] is used in the correction of each amplitude of a second noise removal spectrum Sr [f].

$$\text{gain}_\beta=\text{MIN}(snr_{sp}[f]\bullet W_\beta[f]+L_\beta,\ 0)$$

$$\beta[f]=10^{(gain\beta/20)} \quad (10)$$

Figure 10:
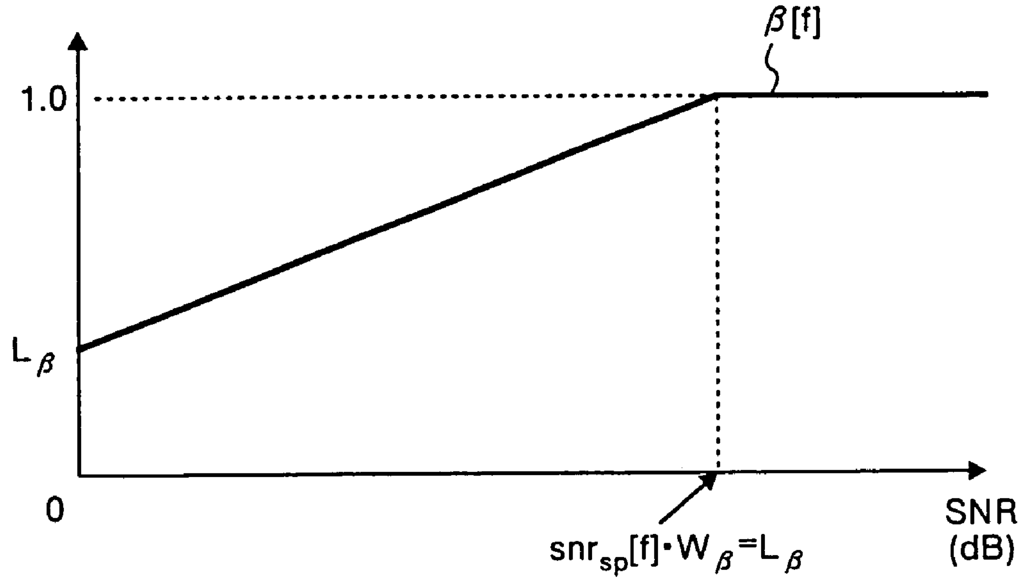
FIG. 10 shows a graph of the noise removal spectrum correction gain.

According to equation (10), when the value $snr_{sp}$ [f] increases, namely when the SNR increases, the value of gains increases, therefore, the noise removal spectrum correction gain β [f] increases, correspondingly. Consequently, when a spectrum component has a large SNR, the amplitude of the noise removal spectrum, the output of the after-mentioned spectrum suppression unit 8, increases. On the other hand, when a spectrum spectrum component has a large SNR, the amplitude of the noise removal spectrum, the output of the after-mentioned spectrum suppression unit 8, increases. On the other hand, when a spectrum component has a small SNR, the amplitude of the output is small. FIG. 10 shows a profile of β [f] with respect to the value of $snr_{snp}$ [f].

Figure 12:
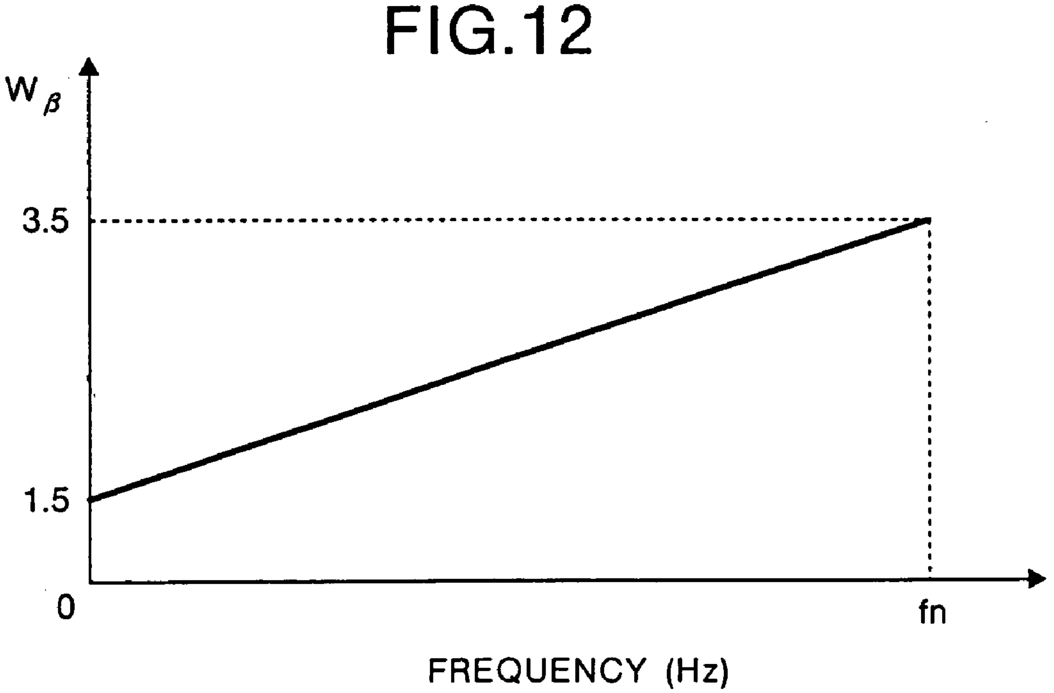
FIG. 12 shows a graph of the phone reception weighting value $W_{\beta}$ as a function of the noise removal spectrum correction gain.
Figure 13:
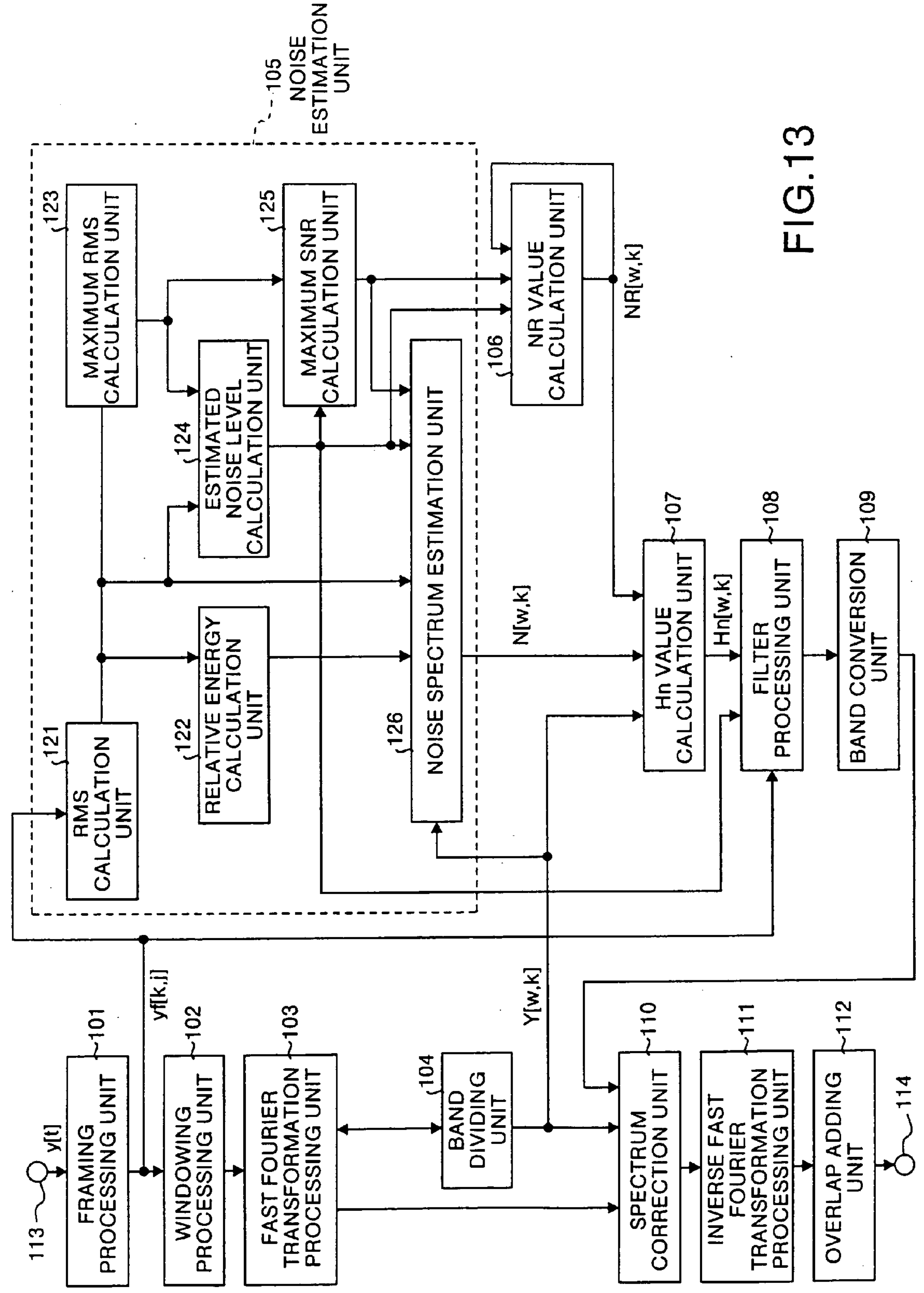
FIG. 13 is a block diagram showing the construction of the noise suppression apparatus of the prior art.

The phone reception weighting value $W_\beta$ [f] is, similar to the aforementioned $W_\alpha$ [f], predetermined according to its parameter, frequency f. The value of $W_\beta$ [f] increases, when the frequency increases. As a result of this weighting, the value of β [f] decreases in the high frequency region. Consequently, excessive suppression in the high frequency region can be avoided so that a generation of a strange sound in the frequency region can be avoided. FIG. 12 shows a profile of the $W_\beta$ [f].

The spectrum deduction unit 7 obtains a product of the noise amplitude spectrum N [f] and the noise amplitude spectrum correction gain α [f], which is sent from the correction gain calculation unit 6. Then, the spectrum deduction unit 7 subtracts the product from the input amplitude spectrum S [f] to output the first noise removal spectrum $S_S$ [f], according to equation (11). When the obtained first noise removal spectrum $S_S$ [f] is negative, the spectrum deduction unit 7 carries out a recovering procedure, namely the result is changed to zero or a predetermined low level noise n [f]. As a result of the multiplication of the noise spectrum by the correction gain α [f], it is possible to decrease the reduction by the noise spectrum component, when the SNR is small. And it is possible to increase the reduction by the noise spectrum component, when the SNR is large. Consequently, an excessive spectrum reduction at a small SNR can be suppressed.

$$L_s[f] = \begin{cases} S[f] - \alpha[-f]\cdot N[f] & \text{if } S[f] - \alpha[f]\cdot N[f] > 0 \\ 0 \text{ or } n[f] & \text{else} \end{cases} \quad (11)$$

The spectrum suppression unit 8, according to equation (12), multiplies the first noise removal spectrum $S_S$ [f] by the noise removal spectrum correction gain β [f], which is sent from the correction gain calculation unit 6, to output a second noise removal spectrum $S_r$ [f]. By multiplying the first noise removal spectrum $S_S$ [f] by the noise removal spectrum correction gain β [f], it is possible to suppress the residual noise after the reduction of the spectrum in the spectrum deduction unit 7. Also a musical noise, which appears as a result of the spectrum deduction, can be suppressed. Moreover, the amplitude suppression at a small SNR is weakened, and the amplitude suppression at a high SNR can be enhanced. As a result, an excessive amplitude suppression at a small SNR can be avoided.

$$S_r[f]=[f]\cdot S_S[f] \quad (12)$$

The frequency/time conversion unit 9 carries out a procedure inverse to that in the time/frequency conversion unit 2. For example, it carries out an inverse Fast Fourier Transformation to obtain a time signal $s_r$ [t], on the basis of the second noise removal spectrum $s_r$ [f] and the phase spectrum P [f], then superimposes the time signals at the boundary portions of the neighboring frames to output a noise suppressed signal from the output signal terminal 10.

By multiplying the noise spectrum by the noise amplitude spectrum correction gain α [f], it is possible to decrease the reduction by the noise spectrum components when SNR is low, and to increase the reduction by the noise spectrum components when the SNR is high. Thus, an excessive spectrum reduction at low SNR can be avoided. Further, by multiplying the first noise removal spectrum by the noise removal spectrum correction gain β [f], it is possible to suppress the residual noise after the reduction of the spectrum as well as a musical noise, which appears as a result of the spectrum reduction.

When the SNR is small, the amplitude suppression is weakened, on the other hand, when the SNR is large, the amplitude suppression can be enforced. Thus, an excessive amplitude suppression at low SNR can be avoided. Moreover, even when the level of the input sound signal suddenly changes, for example, at a head of words in speech, the spectrum reduction procedure and the spectrum amplitude suppression procedure are carried out, corresponding not only to the noise signal level but also to the input signal level. Therefore, an impression of the extinguishment or hiding of the head of words in speech as well as the impression of the spectrum change, which may be caused by an excessive spectrum reduction as well as an excessive suppression, can be avoided. Consequently, it is possible to suppress the noise in noise sections and to avoid an excessive suppression of spectrum in sound sections, simultaneously, thus, a suitable noise suppression can be attained.

The noise suppression apparatus according to the second embodiment of the present invention is explained below, referring to FIG. 2.

Figure 2:
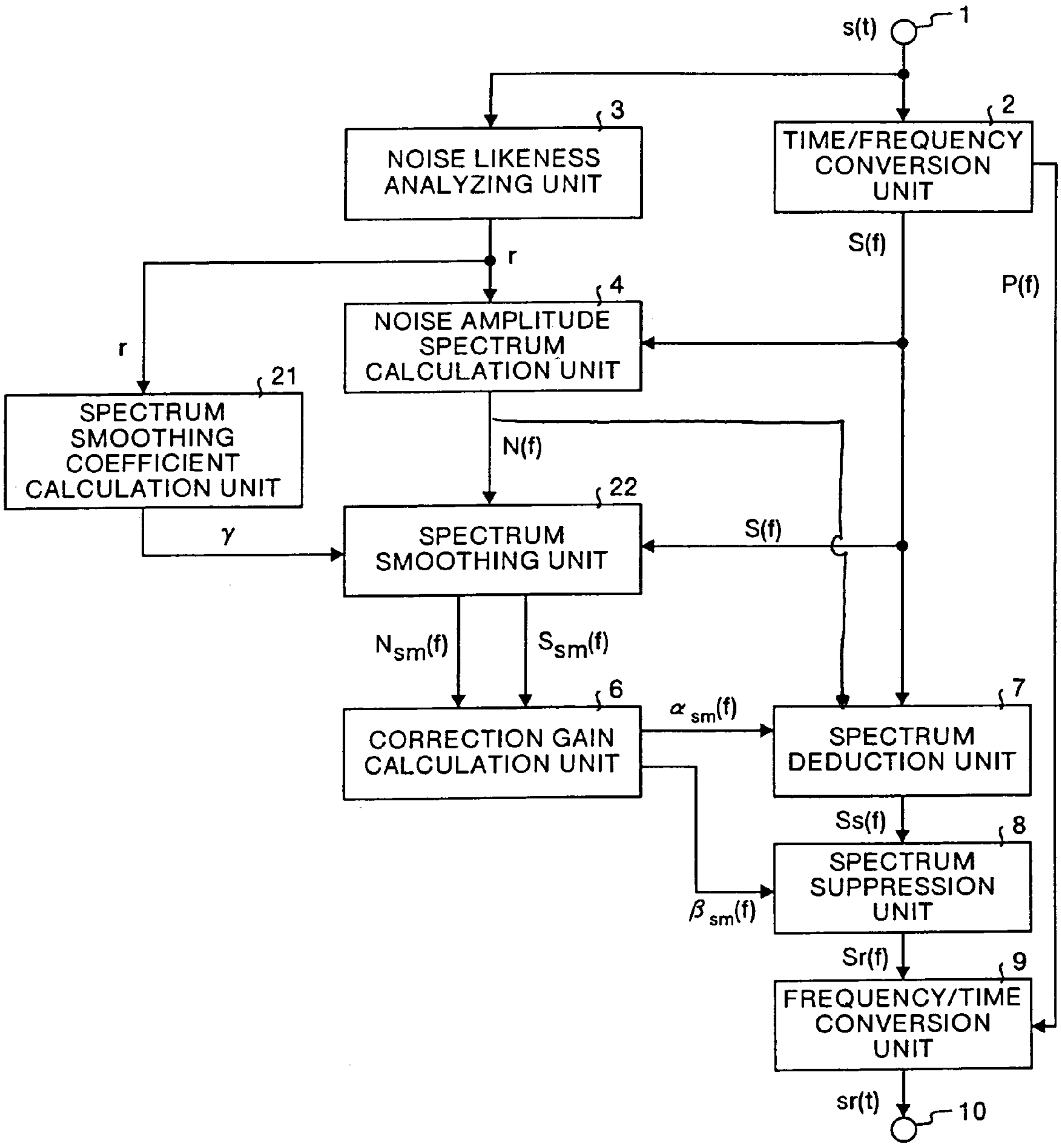
FIG. 2 is a block diagram showing the construction of the noise suppression apparatus according to the second embodiment of the present invention.

FIG. 2 is a block diagram showing the construction of the noise suppression apparatus according to the second embodiment. The construction of the apparatus differs from that shown in FIG. 1 in that the spectrum correction gain limiting value calculation unit 5 is removed, and newly a spectrum smoothing coefficient calculation unit 21 and a spectrum smoothing unit 22 are added. The other elements are identical to that in the apparatus of the first embodiment. Therefore, their explanation are omitted. The principle of the function of the second embodiment is explained below with reference to FIG. 2.

The spectrum smoothing coefficient calculation unit 21 calculates a time base spectrum smoothing coefficient $\gamma_t$ for smoothing the spectrum in the time base, and a frequency base spectrum smoothing coefficient $\gamma_f$ for smoothing the spectrum in a frequency base, corresponding to the level of the noise likeness of the input signal, which is outputted from the noise likeness determining unit 3.

The smoothing coefficient corresponding to the noise likeness can be calculated, for example, referring a table which gives a smoothing coefficient corresponding to a noise likeness. Table 2 is an example of such a table. Using such a table, it is possible to select smoothing coefficients $\gamma_t$, $\gamma_f$ so as to enhance the smoothing in noise sections when the noise likeness is large. On the other hand, it is possible to select smoothing coefficients $\gamma_t$, $\gamma_f$ so as to weaken the smoothing when the noise likeness is small, namely, in sound sections.

TABLE 2

| Noise likeness level | Noise level | Smoothing coefficient $\gamma_t$ | Smoothing coefficient $\gamma_f$ |
|---|---|---|---|
| 0 | Noise level is high | 0.5 | 0.7 |
| 1 | Noise level is high | 0.6 | 0.8 |
| 2 | Noise level is high | 0.7 | 0.85 |
| 3 | Noise level is high | 0.8 | 0.9 |
| 4 | Noise level is low | 0.9 | 0.95 |

The spectrum smoothing unit 22, according to equations (13) and (14), smoothes the input amplitude spectrum S [f] and the noise amplitude spectrum N [f] in the time base as well as in the frequency base, using the time base smoothing coefficient $\gamma_t$ and the frequency base smoothing coefficient $\gamma_f$, and calculates a smoothed input amplitude spectrum $S_{sm}$ [f] and a smoothed noise amplitude spectrum $N_{sm}$ [f].

First, the input amplitude spectrum S [f] and the noise amplitude spectrum N [f] are smoothed in the time base to calculate a time smoothed input amplitude spectrum $S_t$ [f] and a time smoothed noise amplitude spectrum $N_t$ [f], according to equation (13). Here the $S_{pre}$ [f], $N_{pre}$ [f] are the input amplitude spectrum and the noise amplitude spectrum in the last former frames. Where fn is the Nyquist frequency.

$$S_t[f]=\gamma_t \cdot S[f]+(1-\gamma_t)\cdot S_{pre}[f],\ f=0, \ldots, fn$$

$$N_t[f]=\gamma_t \cdot N[f]+(1-\gamma_t)\cdot N_{pre}[f],\ f=0, \ldots, fn \tag{13}$$

Next, the time smoothed input amplitude spectrum $S_t$ [f] and the time smoothed noise amplitude spectrum $N_t$ [f] are smoothed in the frequency base obtained using equation (13) according to the equation (14) to calculate a smoothed input amplitude spectrum $S_{sm}$ [f] and a smoothed noise amplitude spectrum $N_{sm}$ [f]. They are outputted from the spectrum smoothing unit 22.

$$S_{sm}[f]=\gamma_f \cdot S_t[f]+(1-\gamma_f)\cdot S_t[f-1],\ f=1, \ldots, fn$$

$$N_{sm}[f]=\gamma_f \cdot N_t[f]+(1-\gamma_f)\cdot N_t[f-1],\ f=1, \ldots, fn \tag{14}$$

The correction gain calculation unit 6 calculates a noise amplitude spectrum gain α [f] and a noise removal spectrum correction gain β [f], in place of the input amplitude spectrum S [f] and the noise amplitude spectrum N [f], using the smoothed input amplitude spectrum $S_{sm}$ [f] and the smoothed noise amplitude spectrum $N_{sm}$ [f].

First, a smoothed SNR $snr_{sp\text{-}sm}$ [f] for each of the frequency components is obtained, using the smoothed input amplitude spectrum $S_{sm}$ [f] and the smoothed noise amplitude spectrum $N_{sm}$ [f], according to equation (15).

$$snr_{sp-sm}[f](dB) = \begin{cases} 20\log_{10} S_{sm}[f]/N_{sm}[f] & \text{if } S_{sm}[f] > N_{sm}[f] \\ & f = 0, \ldots, f_n \\ 0 & \text{else} \end{cases} \tag{15}$$

Then, a smoothed noise amplitude spectrum $\alpha_{sm}$ [f] and a smoothed noise removal spectrum correction gain $\beta_{sm}$ [f] are calculated, using the smoothed SNR $snr_{sp\text{-}sm}$ [f], according to equations (16) and (17).

$$\text{gain}_\alpha=\text{MIN}(snr_{sp\text{-}sm}[f]\cdot W_\alpha[f]+Pn,\ 0)$$

$$\alpha_{sm}[f]\ \alpha_{MAX}\cdot\{(Pn_{MIN}+\text{gain}_\alpha)/Pn_{MIN}\} \tag{16}$$

$$\text{gain}_\beta=\text{MIN}(snr_{sp\text{-}sm}[f]\cdot W_\beta[f]+Pn(=\beta_{MIN}),\ 0)$$

$$\beta_{sm}[f]=10^{(gain\beta/20)} \tag{17}$$

In this second embodiment, the correction gain is obtained, using the smoothed SNR $snr_{sm}$ [f]. Therefore, in noise sections, where the SNR (the ratio of input sound signal to the noise signal) is small, the variation of the spectrum correction gain can be strongly suppressed. On the other hand, in sound sections, where the SNR is large, the variation of the correction gain is not so strongly suppressed.

The equations (16) and (17) differ from the equations (9) and (10) in the first embodiment. The former equations use neither the noise amplitude spectrum correction gain limiting value $L_\alpha$ nor the noise removal spectrum correction gain limiting value $L_\beta$. The quantity $\alpha_{max}$ in equation (16) is the noise amplitude spectrum correction gain maximum value, and the quantity $\beta_{min}$ in equation (17) is the noise removal spectrum correction gain minimum value ($\beta_{min}$=Pn). Each of them is a predetermined constant value.

In this second embodiment, the spectrum smoothing coefficient is controlled, corresponding to the level of the noise likeness. Therefore, it is possible to select the smoothing coefficients so as to enhance the smoothness, when the noise likeness is strong, to weaken the smoothness, when the noise likeness is small, namely, in sound sections, and to enhance the smoothness, when the noise likeness is strong, namely, in noise section. Thus, a further suitable control of the spectrum correction gain is possible, and a suitable noise suppression can be attained.

The feeling that the noise removal spectrum changed discontinuously can be weakened remarkably, when the preciseness of the spectrum correction gain is low, namely when the SNR is low, for example, due to high level noises.

Figure 3:
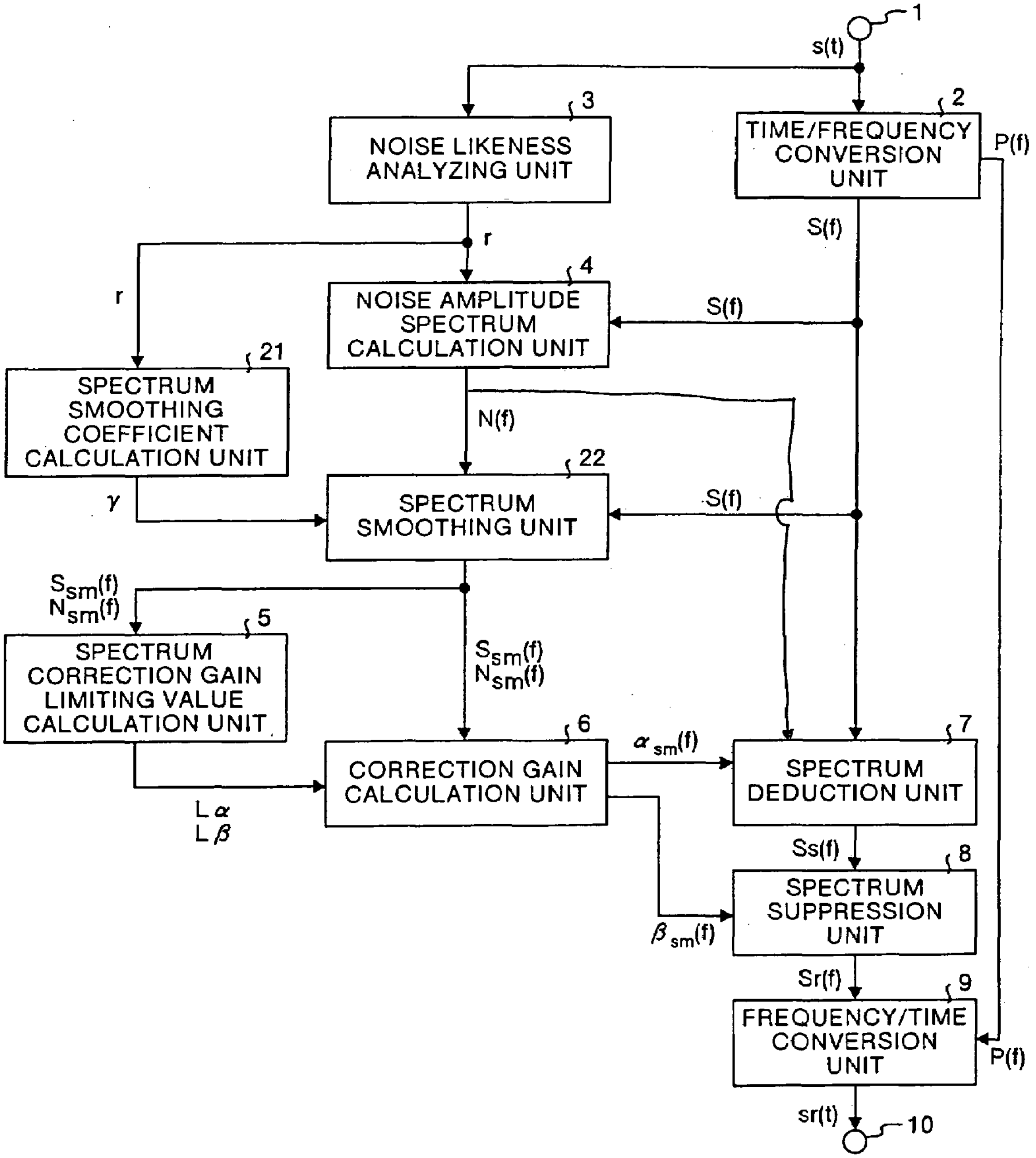
FIG. 3 is a block diagram showing the construction of the noise suppression apparatus according to the third embodiment of the present invention.

As another modification of the first embodiment, it is possible to introduce the spectrum smoothing procedure explained in the second embodiment into the first embodiment. FIG. 3 is a block diagram showing the construction of the third embodiment.

The spectrum smoothing unit 22 calculates the limiting values $L_\alpha$ and $L_\beta$, on the basis of the smoothed input amplitude spectrum $S_{sm}$ [f] and the smoothed noise amplitude spectrum $N_{sm}$ [f], according to a procedure explained in the second embodiment. The spectrum correction gain limiting value calculation unit 5 calculates the noise amplitude spectrum correction gain limiting value $L_\alpha$ and the noise removal spectrum correction gain limiting value $L_\beta$, according to a procedure similar to that in the first embodiment.

The correction gain calculation unit 6 calculates the noise amplitude spectrum correction gain α [f] and the noise removal spectrum correction gain β [f], according to equations (9) and (10) as in the first embodiment. In the calculation of the gains α [f] and β [f], the smoothed input amplitude spectrum $S_{sm}$ [f] and the smoothed noise amplitude spectrum $N_{sm}$ [f], which are sent from the spectrum smoothing unit 22, along with the noise amplitude spectrum correction gain limiting value $L_\alpha$ and the noise removal spectrum correction gain limiting value $L_\beta$, which are sent from the spectrum correction gain limiting value calculation unit 5, are used.

The other construction of the third embodiment are identical to those explained in the first and second embodiments. Therefore, their explanation is omitted.

When this third embodiment is employed, a synergistic advantages of the first and second embodiments can be obtained, adding to the advantages of the first embodiment. As a result, further suitable noise suppression can be attained.

Figure 4:
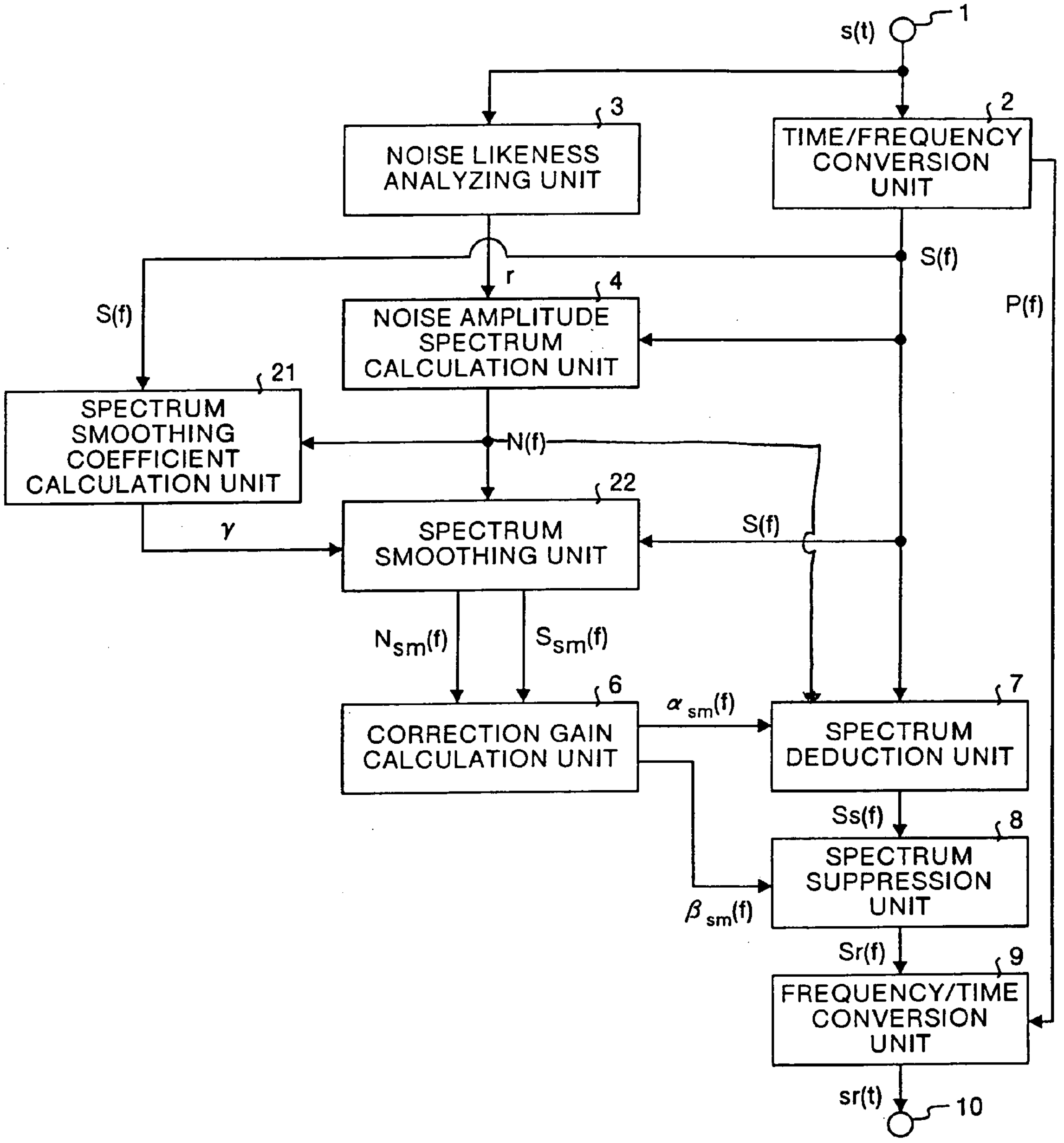
FIG. 4 is a block diagram showing the construction of the noise suppression apparatus according to the fourth embodiment of the present invention.

The spectrum smoothing coefficient corresponding to the state of the input sound can be calculated, for example, on the basis of the SNR of the present frame. FIG. 4 is a block diagram showing the construction of the fourth embodiment.

First, the spectrum smoothing coefficient calculation unit 21 obtains the SNR $SNR_{fr}$ of the input signal in the present frame, according to equation (18).

$$SNR_{fr}(dB) = 10\log_{10}\frac{\sum S[f]\cdot S[f]}{\sum N[f]\cdot N[f]} \tag{18}$$

Next, a temporal coefficient $\gamma_t'$ of the time base spectrum smoothing coefficient and a temporal coefficient $\gamma_f'$ of the frequency base spectrum smoothing coefficient are obtained, on the basis of the SNR $SNR_{fr}$ of the frame, according to equation (19). The time base spectrum smoothing coefficient is used for smoothing in the time base, and the frequency base spectrum smoothing coefficient is used for smoothing in the frequency base.

$$\gamma_t' = \begin{cases} 0.9 & \text{if} \quad SNR_{fr} > SNRth_{fr} \\ 0.5 & \text{else} \end{cases} \tag{19}$$

$$\gamma_f' = \begin{cases} 0.9 & \text{if} \quad SNR_{fr} > SNRth_{fr} \\ 0.5 & \text{else} \end{cases}$$

Then, according to equation (20), AR smoothing of the temporal smoothing coefficients $\gamma_t'$ and $\gamma_f'$ are carried out, using the smoothing coefficients $\gamma(\text{old})_t$ and $\gamma(\text{old})_f$ of the former frame, to output the time base spectrum smoothing coefficient $\gamma_t$ and the frequency base spectrum smoothing coefficient $\gamma_f$.

$$\gamma_t = 0.8\cdot\gamma_t' + 0.2\cdot\gamma(\text{old})_t$$

$$\gamma_f = 0.8\cdot\gamma_f' + 0.2\cdot\gamma\ (\text{old})_f \tag{20}$$

In this fourth embodiment, the input amplitude spectrum and the noise amplitude spectrum are smoothed, using spectrum smoothing coefficients, which correspond to the SNR of the input signal. On the basis of these quantities, a spectrum correction gain is calculated. And the noise suppression processing is carried out, using the spectrum correction gain. Therefore, the variation of the spectrum correction gain can be controlled, corresponding to the SNR of the input signal. Thus, according to this fourth embodiment, it is possible to weaken the strange feeling that the noise removal spectrum in the time base or in the frequency base changed discontinuously, even in noise sections, for example, where the SNR is low. Namely, it is possible to suppress the generation of a strange sound in the output sound so that a suitable suppression of noise can be attained.

As another modification of the first embodiment, it is possible to divide the input amplitude spectrum into a plurality of bands, instead of classifying the input amplitude spectrum according to frequency components. The noise amplitude spectrum correction gain as well as the noise removal spectrum correction gain are calculated, on the basis of the mean spectrum of each band. And the spectrums can be corrected, using these gains.

In this fifth embodiment, the spectrum band dividing unit precedes the spectrum correction gain limiting value calculation unit 5. This spectrum band dividing unit divides the input amplitude spectrum, which is sent from the time/frequency conversion unit 2, into a plurality of frequency bands and calculates the mean spectrum of each of the frequency bands. Simultaneously, the spectrum band dividing unit divides the noise amplitude spectrum, which is sent from the noise amplitude spectrum calculation unit 4, into a plurality of frequency bands and calculates the average spectrum of each of the frequency bands.

The spectrum band dividing unit divides the input amplitude spectrum into, for example, 16 channels (hereinafter abbreviated to ch), and calculates the average spectrum $S_{ave}$ [ch] of the input signal of each of the frequency channels and the average spectrum $N_{ave}$ [ch] of the noise signal of each of the frequency channels, according to equation (21). $n_{ch}$ is the number of spectrum component in channel ch.

$$S_{ave}[ch] = \sum_{f}^{n_{ch}} S[f]/n_{ch} \tag{21}$$

$$N_{ave}[ch] = \sum_{f}^{n_{ch}} N[f]/n_{ch}$$

Next, the spectrum correction gain limiting value calculation unit 5 calculates an input signal power $Ps_{ave}$ and a noise signal power $Pn_{ave}$, on the basis of the average spectrum $S_{ave}$ [ch] and $N_{ave}$ [ch] obtained using equation (21), and obtains a total SNR $snr_{all\text{-}ave}$, according to equation (22). $Pn_{MIN}$ is a minimum noise power and a predetermined constant.

$$Ps_{ave}(dB) = 10\log_{10}(\Sigma\, S_{ave}[ch]\cdot S_{ave}[ch])\ Pn_{ave}(dB) = \text{MAX}(-10\log_{10}(\Sigma\, N_{ave}[ch]\cdot N_{ave}[ch],\ Pn_{MIN})$$

$$snr_{all\text{-}ave} = Ps_{ave} + Pn_{ave} \tag{22}$$

Subsequently, the noise amplitude spectrum correction gain limiting value $L_\alpha$ and the noise removal spectrum correction gain limiting value $L_\beta$ are calculated, on the basis of the obtained input signal power $Ps_{ave}$ and the noise signal power $Pn_{ave}$, in place of the Ps and Pn in the first embodiment.

The correction gain calculation unit 6 calculates the SNR $snr_{sp}$ [ch] of each channel, according equation (23), then calculates the noise amplitude correction gain α [ch] and the noise removal spectrum correction gain β [ch] of each channel, on the basis of the SNR $snr_{sp}$ [ch]. Here Nch is the total number of the channels.

$$snr_{sp}[ch](dB) = \begin{cases} 20\log_{10}(S_{ave}[ch]/N_{ave}[ch]) & \text{if } S_{ave}[ch] > N_{ave}\{ch\} \quad ch = o, \ldots, N_{CH} \\ 0 & \text{else} \end{cases} \tag{23}$$

The correction gains are inputted to the spectrum deduction unit 7 and the spectrum suppression unit 8. A value corresponding to each of the spectrum component is selected in the unit 7 and 8, respectively. Then the spectrum reduction procedure and the spectrum amplitude suppression procedure are carried out, respectively.

When this fifth embodiment is employed, adding to the advantages of the first embodiment of the present invention, one can obtain advantages to reduce the amount of the calculation for the spectrum correction gain as well as to reduce the memory space for storing the spectrum correction gain.

Figure 5:
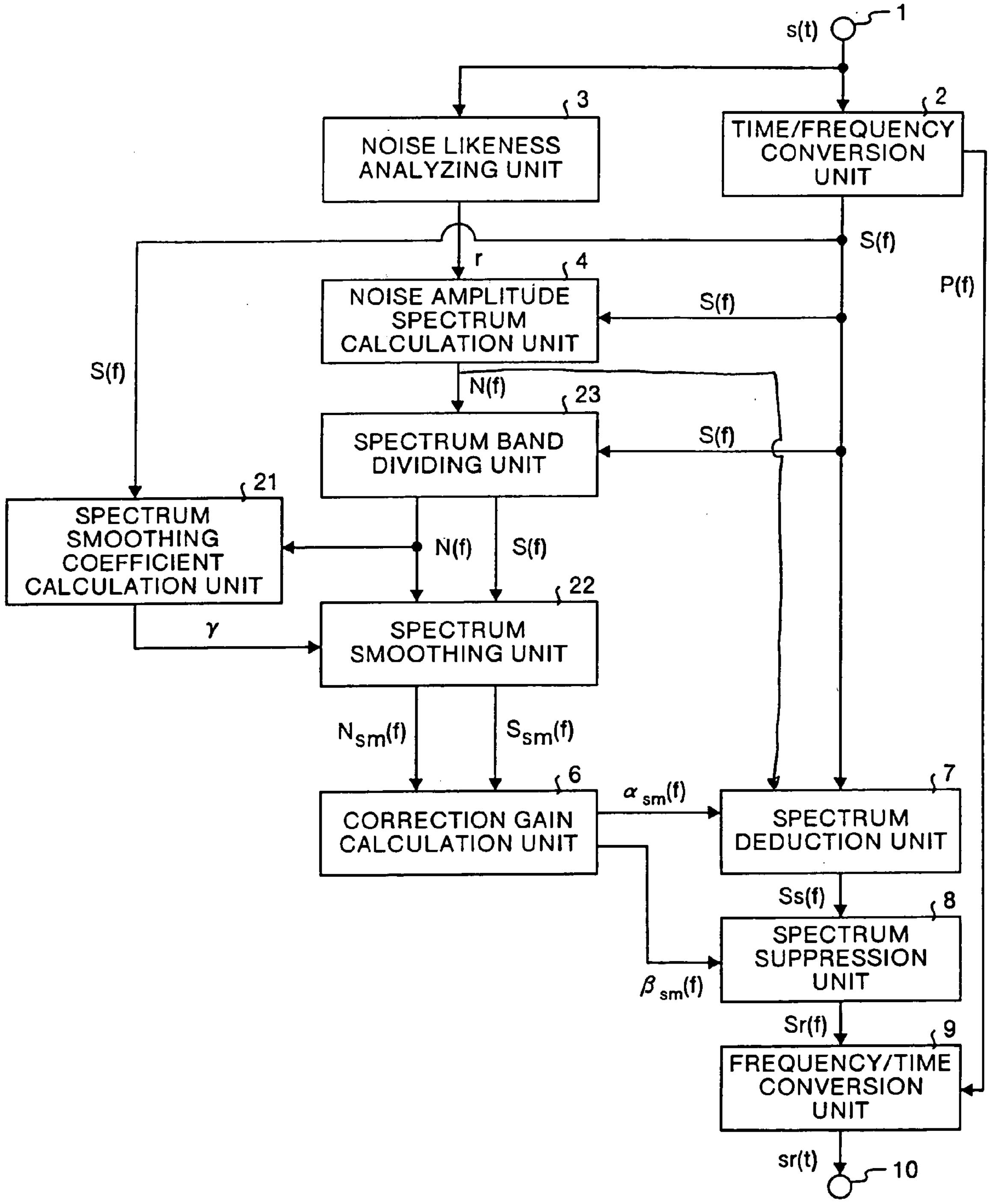
FIG. 5 is a block diagram showing the construction of the noise suppression apparatus according to the sixth embodiment of the present invention.

As another modification of the fourth embodiment, the input amplitude spectrum can be divided not corresponding to the frequency component but into a plurality of band regions, and to calculate the spectrum smoothing coefficient on the basis of the average spectrum of each of the band regions. FIG. 5 is a block diagram showing the construction of the sixth embodiment.

In FIG. 5, reference numeral 23 denotes a spectrum band dividing unit. The spectrum band dividing unit 23 divides the input amplitude spectrum, which is sent from the time/frequency conversion unit 2, into a plurality of frequency bands, and calculates the average spectrum of each of the frequency bands. The spectrum band dividing unit 23 divides also the noise amplitude spectrum, which is sent from the noise amplitude spectrum calculation unit 4, into a plurality of frequency bands, and calculates the average spectrum of each of the frequency bands.

The spectrum band region dividing unit 23 divides the input amplitude spectrum, into 16 bands, for example, and calculates the average spectrum $S_{ave}$ [ch] of the input signal and the average spectrum $N_{ave}$ [ch] of the noise signal in each of the band channel (called channel ch), according to the procedure similar to equation (21).

Subsequently, the spectrum smoothing coefficient calculation unit 21 calculates the SNR $SNR_{fr\text{-}ave}$ of the present frame, on the basis of the average spectrum $S_{ave}$ [ch] of the input signal and the average spectrum $N_{ave}$ [ch] of the noise signal, according to (24).

$$SNR_{fr-ave}(dB) = 10\log_{10}\frac{\sum S_{ave}[ch]\bullet S_{ave}[ch]}{\sum N_{ave}[ch]\bullet N_{ave}[ch]} \tag{24}$$

Then the spectrum smoothing coefficient calculation unit 21 calculates and outputs the time base spectrum smoothing coefficient $\gamma_t$ and the frequency base spectrum smoothing coefficient $\gamma_f$, on the basis of the SNR $SNR_{fr\text{-}ave}$ calculated using the average spectrum, in place of the SNR $SNR_{fr}$. The calculation is carried out, according to equations (14) and (15) in the second embodiment.

The spectrum smoothing unit 22 smoothes the average spectrum $S_{ave}$ [ch] of the input signal and the average spectrum $N_{ave}$ [ch] of the noise signal in either of the time base and the frequency base, then calculates an average spectrum $S_{sm\text{-}ave}$ [ch] of the input signal and a smoothed noise average spectrum $N_{sm\text{-}ave}$ [ch], according to equations (25) and (26). This procedure is carried out, on the basis of the time base smoothing coefficient $\gamma_t$ and the frequency base smoothing coefficient $\gamma_f$, which are obtained from the average spectrum.

First, the average spectrum $S_{ave}$ [ch] of the input signal and the average spectrum $N_{ave}$ [ch] of the noise signal are smoothed in the time base, and an average spectrum $S_{t\text{-}ave}$ [ch] of the time smoothed input signal and an average spectrum $N_{t\text{-}ave}$ [ch] of the time smoothed noise signal are obtained, according to equation (25). $S_{pre\text{-}ave}$ [ch] and $N_{pre\text{-}ave}$ [ch] in equation (25) are, respectively, the average spectrum of the input signal and the average spectrum of the noise signal in the former frame. Here, Nch is the maximum number of the channels.

$$S_{t-ave}[ch]=\gamma_t\cdot S_{ave}[ch]+(1-\gamma_t)\cdot S_{pre-ave}[ch],\ ch=0,\ldots,N_{ch}\ N_{t-ave}[ch]=\gamma_t\cdot N_{ave}[ch]+(1-\gamma_t)\cdot N_{pre-ave}[ch],\ ch=0,\ldots,N_{ch} \tag{25}$$

Subsequently, the average spectrum $S_{t\text{-}ave}$ [ch] of the time smoothed input signal and the average spectrum $N_{t\text{-}ave}$ [ch] of the time smoothed noise signal obtained according to equation (25) are smoothed in the frequency base, to obtain a smoothed input amplitude spectrum $S_{sm\text{-}ave}$ [ch] and a smoothed noise amplitude spectrum $N_{sm\text{-}ave}$ [ch], which are outputs of the spectrum smoothing unit, according to equation (26).

$$S_{sm-ave}[ch]=\gamma_f\cdot S_{t-ave}[ch]+(1-\gamma_f)\cdot S_{t-ave}[ch-1],\ ch=0,\ldots,N_{ch}$$

$$N_{sm-ave}[ch]=\gamma_f\cdot N_{t-ave}[ch]+(1-\gamma_f)\cdot N_{t-ave}[ch-1],\ ch=0,\ldots,N_{ch} \tag{26}$$

The correction gain calculation unit 6 calculates the noise amplitude spectrum correction gain α [ch] and the noise removal spectrum correction gain β [ch] for each of the channels, on the basis of average spectrum $S_{sm\text{-}ave}$ [ch] of the smoothed input amplitude spectrum and the average spectrum $N_{sm\text{-}ave}$ [ch] of the smoothed noise amplitude spectrum in place of the smoothed input amplitude spectrum $S_{sm}$ [f] and the smoothed noise amplitude spectrum $N_{sm}$ [f].

First, a smoothed SNR $Snr_{sm\text{-}ave}$ [f] for each of the channels is obtained, on the basis of the average spectrum $S_{sm\text{-}ave}$ [ch] of the smoothed input amplitude spectrum and the average spectrum $N_{sm\text{-}ave}$ [ch] of the smoothed noise amplitude spectrum, according to equation (27).

$$snr_{ch-sm}[ch](dB) = \begin{cases} 20\log_{10}(S_{sm-ave}[ch]/N_{sm-ave}[ch] & \text{if } S_{sm-ave}[ch] > N_{sm-ave}[ch] \\ 0 & \text{else} \end{cases} \tag{27}$$

Then, a smoothed noise amplitude spectrum correction gain $\alpha_{sm}$ [ch] and a smoothed noise removal spectrum correction gain $\beta_{sm}$ [ch] are calculated, on the basis of the smoothed SNR $Snr_{ch\text{-}sm}$ [ch], according to equations (28) and (29).

$$\text{gain}_\alpha=\text{MIN}(snr_{ch-sm}[ch]\cdot W_\alpha[ch]+Pn,\ 0)$$

$$\alpha_{sm}[ch]=\alpha_{MAX}\cdot\{(Pn_{MIN}+\text{gain}_\alpha)/Pn_{MIN}\} \tag{28}$$

$$\text{gain}_\beta=\text{MIN}(snr_{ch-sm}[ch]\cdot W_\beta[ch]+Pn(=\beta_{MIN},\ 0)$$

$$\beta_{srm}[ch]=10^{(gain\beta/20)} \tag{29}$$

Finally, the spectrum reduction procedure and the spectrum suppression procedure are carried out, on the basis of the obtained smoothed noise amplitude spectrum correction gain $\alpha_{sm}$ [ch] and the smoothed noise removal spectrum correction gain $\beta_{sm}$ [ch].

When this sixth embodiment is employed, one can obtain advantages in that it is possible to reduce the amount of the calculation for the spectrum smoothing coefficients and for smoothing the spectra as well as to reduce the memory space for storing the spectrum smoothing coefficient, adding to the advantages of the second embodiment of the present invention.

Figure 6:
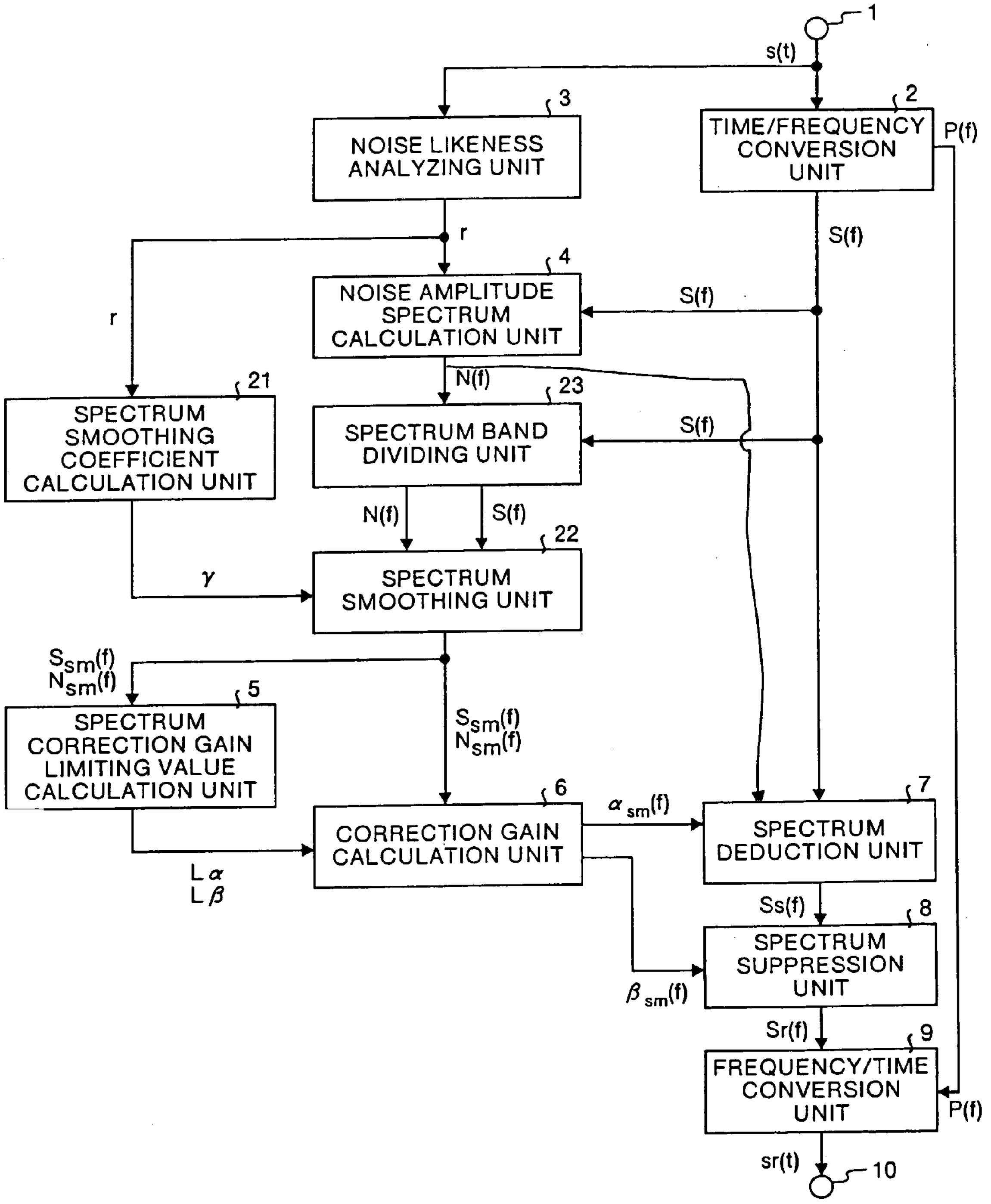
FIG. 6 is a block diagram showing the construction of the noise suppression apparatus according to the seventh embodiment of the present invention.

As another modification of the third embodiment, a combination of the fifth and sixth embodiments is possible. FIG. 6 is a block diagram showing the construction of the seventh embodiment.

The spectrum band dividing unit 23 divides the input amplitude spectrum into a plurality of frequency bands and calculates the average spectrum for each of the frequency bands. Further, the spectrum band dividing unit 23 divides the noise amplitude spectrum into a plurality of the frequency bands and calculates the average spectrum for each frequency bands, in the same manner as in the sixth embodiment.

The spectrum smoothing unit 22 smoothes the average spectrum $S_{ave}$ [ch] for each frequency band of the input signal and the average spectrum $N_{ave}$ [ch] for each frequency band of the noise signal. The smoothing is carried out in the time base and in the frequency base, using the time smoothing coefficient $\gamma_t$ and the frequency smoothing coefficient $\gamma_f$, which are obtained in the spectrum smoothing coefficient calculation unit 21 so that a smoothed input average spectrum $S_{sm\text{-}ave}$ [ch] and a smoothed noise average spectrum $N_{sm\text{-}ave}$ [ch] are calculated.

Then the spectrum correction gain limiting value calculation unit 5 calculates the input signal power $Ps_{ave}$ and the noise signal power $Pn_{ave}$, on the basis of the smoothed input average spectrum $S_{sm\text{-}ave}$ [ch] and the smoothed noise average spectrum $N_{sm\text{-}ave}$ [ch], according to equation (22) so as to calculate an all frequency range SNR $snr_{all\text{-}ave}$. $Pn_{MIN}$ in equation (22) is a minimum noise power and is a predetermined constant.

Subsequently, the noise amplitude spectrum correction gain limiting value $L_\alpha$ and the noise removal spectrum correction gain limiting value $L_\beta$ are calculated, on the basis of the obtained input signal power $Ps_{ave}$ and the noise signal power $Pn_{ave}$ in place of the Ps and Pn in the first embodiment.

The correction gain calculation unit 6 obtains the SNR $snr_{sp}$ [ch] for each channel, according to equation (23), then calculates the noise amplitude spectrum correction gain α [ch] and noise removal spectrum correction gain β [ch], using the obtained SNR $Snr_{sp}$ [ch]. $N_{ch}$ in equation (23) is the total number of the channels.

The other construction of this embodiment is identical to those explained in connection with the fifth and sixth embodiment. Thus its explanation is omitted here.

When this seventh embodiment is employed, one can obtain advantages in that it is possible to reduce the amount of the calculations for the spectrum correction gain, the spectrum smoothing coefficient and smoothing of the spectrum as well as to reduce the memory space for storing the spectrum correction gain and the spectrum smoothing coefficient, adding to the advantages of the third embodiment of the present invention.

As explained above, in the noise suppression apparatus according to one aspect of the present invention, the following procedures are carried out. That is, corresponding to the noise likeness of the input signal frame, the noise amplitude spectrum is calculated using the input amplitude spectrum of the frame, then the noise amplitude spectrum correction gain and the noise removal spectrum correction gain are calculated on the basis of the noise amplitude spectrum, an input amplitude spectrum and respective coefficients; the first noise removal spectrum is calculated by deducting the product of the noise amplitude spectrum and the noise amplitude spectrum correction gain from the input amplitude spectrum; the second noise removal spectrum is calculated by multiplying the first noise removal spectrum by the noise removal spectrum correction gain, which is sent from the correction gain calculation unit; and the second noise removal spectrum is transformed into a time domain signal. Because a suitable spectrum reduction and spectrum amplitude suppression corresponding not only to the noise signal level but also to the input signal level are carried out, even at a section where the input sound signal suddenly changes, for example, at the head portion of words in speech, the impression of extinguishment or hiding of the head portion of the words in speech, due to an excessive spectrum reduction or suppression, can be avoided. It is possible to enhance the noise suppression in sound sections, avoiding an excessive spectrum suppression in sound sections. Thus, a suitable noise suppression can be attained.

Further, because the noise removal spectrum correction gain is multiplied by the first noise removal spectrum, so-called residual noises, which may be caused by the residual noise, which is the residual portion of the spectrum after the spectrum reduction and so-called musical noises, which may be caused by the spectrum reduction, can be suppressed.

Further, a spectrum smoothing coefficient control corresponding to the noise likeness is attained, by carrying out the following procedures. That is, smoothing of the input amplitude spectrum and the noise amplitude spectrum in the time base and the frequency base, on the basis of the input amplitude spectrum and the noise amplitude spectrum, corresponding to the state of the input signal; the calculation of the smoothed input amplitude spectrum and the smoothed noise amplitude spectrum; and the calculation of the noise amplitude spectrum correction gain and the noise removal spectrum correction gain, on the basis of the smoothed input amplitude spectrum and the smoothed noise amplitude spectrum. The spectrum smoothing coefficient is controlled, corresponding to the level of the noise likeness. As a result, it is possible to weaken the smoothness at sections where the noise likeness is small, i.e., at a sound section, and on the contrary, to enhance the smoothness at sections where the noise likeness is large. Thus a further suitable control of the spectrum correction gain, which allows further suitable noise suppression.

The noise suppression apparatus further comprises a spectrum band dividing unit for dividing the input amplitude spectrum into a plurality of the frequency bands to output an average spectrum for each of the frequency bands, and for dividing the noise amplitude spectrum into a plurality of the frequency bands to output an average spectrum for each of the frequency bands, the average spectra are used in calculations of the smoothing coefficients and the smoothed spectrums. As a result, the impression of extinguishment or hiding of the head portion of the words in speech, due to an excessive spectrum reduction or suppression can be avoided. It is possible to enhance the noise suppression in sound sections, simultaneously avoiding an excessive spectrum suppression in sound sections. Thus, a suitable noise suppression can be attained. The spectrum smoothing coefficient is controlled, corresponding to the level of the noise likeness. As a result, it is possible to weaken the smoothness at sections where the noise likeness is small, i.e., at a sound section, and on the contrary, to enhance the smoothness at sections where the noise likeness is large. Thus a further suitable control of the spectrum correction gain, which allows further suitable noise suppression.

Further, the input amplitude spectrum and the noise amplitude spectrum are smoothed, on the basis of the spectrum smoothing coefficients corresponding to the state of the input signal, and the noise suppression processing is carried out, on the basis of the spectrum correction gain, which is calculated from the smoothed input amplitude spectrum and the noise amplitude spectrum. Thus, the variation of the spectrum correction gain can be controlled, corresponding to the state of the input signal. For example, even when the SNR is low, i.e., in noise sections, etc, the impression of the discontinuity in the noise removal spectrum in the time base and the frequency base can be reduced, and the generation of strange sound in such sections can be avoided, namely a stable noise suppression can be attained.

Further, the following procedure is carried out. That is, smoothing of the input amplitude spectrum and the noise amplitude spectrum, on the basis of the smoothing coefficients of the input amplitude spectrum and the noise amplitude spectrum, corresponding to the state of the input signal; calculations of the smoothed input amplitude spectrum and the smoothed noise amplitude spectrum; and calculations of the noise amplitude spectrum correction gain and the noise removal spectrum correction gain, on the basis of the smoothed input amplitude spectrum, smoothed noise amplitude spectrum and the spectrum correction gain limiting value. As a result, adding the advantages that the impression of extinguishment or hiding of the head portion of the words in speech, due to an excessive spectrum reduction or suppression, can be avoided, and that it is possible to enhance the noise suppression in noise sections, simultaneously avoiding an excessive spectrum suppression in sound sections so that a suitable noise suppression can be attained, another advantages are obtained in that it is possible to reduce the amount of the calculations for the spectrum correction gain and to reduce the memory space for storing the spectrum correction gain.

Further, the following procedure is carried out. That is, the input amplitude spectrum is divided into a plurality of frequency bands and the average spectrum is calculated; the noise amplitude spectrum is divided into a plurality of frequency bands and the average spectrum is calculated; the smoothing coefficients of the input amplitude spectrum and the noise amplitude spectrum are calculated for each frequency band; and the smoothed input amplitude spectrum and the smoothed noise amplitude spectrum are calculated, on the basis of the input amplitude average spectrum of each frequency band and the noise amplitude average spectrum of each frequency band. Thus, the spectrum smoothing coefficient is controlled, corresponding to the level of the noise likeness. As a result, it is possible to weaken the smoothness at sections where the noise likeness is small, i.e., at sound sections, and on the contrary, to enhance the smoothness at sections where the noise likeness is large, i.e., in noise sections. Thus a further suitable control of the spectrum correction gain, which allows further suitable noise suppression. Further, another advantages are obtained in that it is possible to reduce the amount of the calculations for the spectrum correction gain and for smoothing the spectrum, and to reduce the memory space for storing the spectrum correction gain.

Further, the spectrum smoothing coefficient calculation unit, the spectrum smoothing unit, the spectrum correction gain limiting value calculation unit and the correction gain calculation unit do not use the input amplitude spectrum nor the noise amplitude spectrum, but use average spectra which are obtained, respectively, by dividing the input amplitude spectrum and the noise amplitude spectrum into a plurality of frequency bands and by calculating their average spectra. As a result, the impression of extinguishment or hiding of the head portion of the words in speech, due to an excessive spectrum reduction or suppression, can be avoided, and it is possible to enhance the noise suppression in noise sections, and avoiding an excessive spectrum suppression in sound sections so that a suitable noise suppression can be attained. The spectrum smoothing coefficient is controlled, corresponding to the level of the noise likeness. As a result, it is possible to weaken the smoothness at sections where the noise likeness is small, i.e., at sound sections, and on the contrary, to enhance the smoothness at sections where the noise likeness is large, i.e., in noise sections. Thus a further suitable control of the spectrum correction gain, which allows further suitable noise suppression, can be attained. Further, another advantages are obtained in that it is possible to reduce the amount of the calculations for calculating the spectrum correction gain, for calculating the spectrum smoothing coefficients and for smoothing the spectrum, as well as to reduce the memory space for storing the spectrum correction gain and the spectrum smoothing coefficients.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A noise suppression apparatus, which can remove an inutile noise from an input signal comprising an object signal and the inutile noise mixed therein to output the object signal, said apparatus comprising:

a time/frequency conversion unit which converts the input signal into an amplitude spectrum and a phase spectrum by frequency-analyzing the input signal in each frame;

a noise-likeness analyzing unit which receives the input signal including the object signal and the noise mixed therein, and which performs linear predictive analysis to obtain linear predictive coefficients used to generate a low pass residual signal, and which performs correlation analysis on the low pass residual signal, and which determines the noise-likeness of the input signal frame;

a noise amplitude spectrum calculation unit which calculates the noise amplitude spectrum from the input amplitude spectrum of the frame on the basis of the result of said noise-likeness analyzing unit;

a spectrum correction gain calculation unit which calculates a noise amplitude spectrum correction gain, on the basis of the input amplitude spectrum, the noise amplitude spectrum and a first predetermined coefficient, and which calculates a noise removal spectrum correction gain, on the basis of the input amplitude spectrum, the noise amplitude spectrum and a second predetermined coefficient;

a spectrum deduction unit which calculates a product of the noise amplitude spectrum and the noise amplitude spectrum correction gain, which is sent from said spectrum correction gain calculation unit, then deducts the product from the input amplitude spectrum so as to output a first noise removal spectrum;

a spectrum suppression unit which calculates a product of the first noise removal spectrum and the noise removal spectrum correction gain so as to output a second noise removal spectrum; and a frequency/time conversion unit which converts the second noise removal spectrum to a time domain signal.

2. The noise suppression apparatus according to claim 1 wherein said spectrum correction gain calculation unit comprises, a spectrum correction gain limiting value calculation unit which calculates spectrum correction gain limiting values, on the basis of the input amplitude spectrum and the noise amplitude spectrum, which spectrum correction gain limiting values limit the correction gains of the noise amplitude spectrum and the noise removal spectrum; and a correction gain calculation unit which calculates a noise amplitude spectrum correction gain and a noise removal spectrum correction gain, on the basis of the input amplitude spectrum, the noise amplitude spectrum and the spectrum correction gain limiting value, which noise amplitude spectrum correction gain corrects the value of the amplitude of the noise amplitude spectrum in each frequency component, and which noise removal spectrum correction gain corrects the value of the amplitude of the noise removal spectrum for each frequency component.

3. The noise suppression apparatus according to claim 2 further comprising a spectrum band dividing unit which divides the input amplitude spectrum sent from said time/ frequency conversion unit into a plurality of frequency bands and calculates the average spectrum of each frequency band, and divides the noise amplitude spectrum from said noise amplitude spectrum calculation unit into a plurality of frequency bands and calculates the average spectrum of each frequency band, wherein said spectrum correction gain limiting value calculation unit and said correction gain calculation unit, that form said spectrum correction gain calculation unit, calculate the spectrum amplitude limiting value, noise amplitude spectrum correction gain and the noise removal spectrum correction gain, on the basis of average spectrum of each frequency band of the input amplitude spectrum and the noise amplitude spectrum, which are outputs of said spectrum band dividing unit, in place of the input amplitude spectrum and the noise amplitude spectrum.

4. The noise suppression apparatus according to claim 1 further comprising, a spectrum smoothing coefficient calculation unit which calculates smoothing coefficients of the input amplitude spectrum and the noise amplitude spectrum, according to the state of the input signal; and a spectrum smoothing unit which smoothes the input amplitude spectrum and the noise amplitude spectrum in the time base and in the frequency base, on the basis of the spectrum smoothing coefficients, and outputs a smoothed input amplitude spectrum and a smoothed noise amplitude spectrum, wherein said spectrum correction gain calculation unit comprises a correction gain calculation unit which calculates a noise amplitude spectrum correction gain and a noise removal spectrum correction gain, on the basis of the smoothed input amplitude spectrum and the smoothed noise amplitude spectrum, which noise amplitude spectrum correction gain is used for correcting the value of the amplitude for each frequency component of the noise amplitude spectrum, and which noise removal spectrum correction gain is used for correcting the value of the amplitude of the noise removal spectrum.

5. The noise suppression apparatus according to claim 4 further comprising a spectrum band dividing unit which divides the input amplitude spectrum sent from said time/frequency conversion unit into a plurality of frequency bands and calculates the average spectrum of each frequency band, and divides the noise amplitude spectrum sent from said noise amplitude spectrum calculation unit and calculates the average spectrum of each frequency band, wherein said spectrum smoothing coefficient calculation unit calculates smoothing coefficients for the input amplitude spectrum and the noise amplitude spectrum, on the basis of the input amplitude average spectrum of each frequency band and the noise amplitude average spectrum of each frequency band, which are sent from said spectrum band dividing unit, and wherein said spectrum smoothing unit calculates the smoothed input amplitude spectrum and the smoothed noise amplitude spectrum, on the basis of the input amplitude average spectrum of each frequency band and the noise amplitude average spectrum of each frequency band, which are sent from said spectrum band dividing unit.

6. The noise suppression apparatus according to claim 2 further comprising, a spectrum smoothing coefficient calculation unit which calculates the smoothing coefficients for the input amplitude spectrum and the noise amplitude spectrum, according to the state of the input signal; and a spectrum smoothing unit which smoothes the input amplitude spectrum and the noise amplitude spectrum in the time base and in the frequency base, using the smoothing coefficients of the spectra, wherein said correction gain calculation unit calculates the noise amplitude spectrum correction gain and the noise removal spectrum correction gain, on the basis of the smoothed input amplitude spectrum, smoothed noise amplitude spectrum and the spectrum correction gain limiting value, in place of the input amplitude spectrum and the noise amplitude spectrum.

7. The noise suppression apparatus according to claim 6 further comprising a spectrum band dividing unit which divides the input amplitude spectrum sent from said time/frequency conversion unit into a plurality of frequency bands and calculates the average spectrum of each frequency band, and divides the noise amplitude spectrum sent from said noise amplitude spectrum calculation unit into a plurality of frequency bands and calculates the average spectrum of each frequency band, wherein said spectrum smoothing coefficient calculation unit, said spectrum smoothing unit, said spectrum correction gain limiting value calculation unit and said correction gain calculation unit use the output from said spectrum band dividing unit in place of the input amplitude spectrum and the noise amplitude spectrum, for carrying out their function.

8. The noise suppression apparatus according to claim 4 wherein said spectrum smoothing coefficient calculation unit calculates the smoothing coefficients for the input amplitude spectrum and the noise amplitude spectrum, according to the result of the noise likeness analyzing unit.

9. The noise suppression apparatus according to claim 6 wherein said spectrum smoothing coefficient calculation unit calculates the smoothing coefficients for the input amplitude spectrum and the noise amplitude spectrum, according to the result of the noise likeness analyzing unit.

10. A noise suppression apparatus, comprising:

a unit for determining noise amplitude spectrum of an input signal from noise-likeness of the input signal, the input signal including a noise component;

a unit for calculating a noise amplitude spectrum gain based on an input amplitude spectrum of the input signal and the noise amplitude spectrum, correcting the noise amplitude spectrum gain with a predetermined first coefficient to obtain a noise amplitude spectrum correction gain, and calculating a noise removed spectrum gain based on the input amplitude spectrum of the input signal and the noise amplitude spectrum;

a unit for performing, with respect to the input amplitude spectrum of the input signal, spectrum subtraction based on the noise amplitude spectrum correction gain and spectrum suppression based on the noise removed spectrum gain to thereby remove the noise component from the input signal.

11. A noise suppression apparatus, comprising:

a unit for determining noise amplitude spectrum of an input signal from noise-likeness of the input signal, the input signal including a noise component;

a unit for calculating a noise amplitude spectrum gain based on an input amplitude spectrum of the input signal and the noise amplitude spectrum, calculating a noise removed spectrum gain based on the input amplitude spectrum of the input signal and the noise amplitude spectrum, and correcting the noise removed spectrum gain using a predetermined second coefficient to obtain a noise removed spectrum correction gain;

a unit for performing, with respect to the input amplitude spectrum of the input signal, spectrum subtraction based on the noise amplitude spectrum gain and spectrum suppression based on the noise removed spectrum correction gain to thereby remove the noise component from the input signal.

12. A noise suppression apparatus, which can remove an inutile noise from an input signal comprising an object signal and the inutile noise mixed therein to output the object signal said apparatus comprising:

a time/frequency conversion unit which converts the input signal into an amplitude spectrum and a phase spectrum by frequency-analyzing the input signal in each frame;

a noise-likeness analyzing unit which receives the input signal including the object signal and the noise mixed therein, and which performs linear predictive analysis to obtain linear predictive coefficients used to generate a low pass residual signal, and which performs correlation analysis on the low pass residual signal, and which determines the noise-likeness of the input signal frame, wherein the correlation analysis generates a position peak value, and the noise-likeness analyzing unit includes an updating rate coefficient determining unit that calculates noise likeness based on the positive peak value;

a noise amplitude spectrum calculation unit which calculates the noise amplitude spectrum from the input amplitude spectrum of the frame on the basis of the result of said noise-likeness analyzing unit;

a spectrum correction gain calculation unit which calculates a noise amplitude spectrum correction gain, on the basis of the input amplitude spectrum, the noise amplitude spectrum and a first predetermined coefficient, and which calculates a noise removal spectrum correction gain, on the basis of the input amplitude spectrum, the noise amplitude spectrum and a second predetermined coefficient;

a spectrum deduction unit which calculates a product of the noise amplitude spectrum and the noise amplitude spectrum correction gain, which is sent from said spectrum correction gain calculation unit, then deducts the product from the input amplitude spectrum so as to output a first noise removal spectrum;

a spectrum suppression unit which calculates a product of the first noise removal spectrum and the noise removal spectrum correction gain so as to output a second noise removal spectrum; and a frequency/time conversion unit which converts the second noise removal spectrum to a time domain signal.

13. The noise suppression apparatus according to claim 12, wherein the updating rate coefficient determining unit calculates the noise likeness further based on a power of the low pass residual signal for a present frame and a power all over a frequency region of the object signal of the present frame.

14. A noise suppression apparatus, comprising:

a unit for determining noise amplitude spectrum of an input signal;

a unit for analyzing noise-likeness of an input signal including an object signal and noise mixed therein, the analyzing unit performing linear predictive analysis to obtain linear predictive coefficients used to generate a low pass residual signal, and performing correlation analysis on the low pass residual signal, and determining the noise-likeness of the input signal, wherein the correlation analysis generates a position peak value, and the unit for analyzing noise-likeness includes an updating rate coefficient determining unit that calculates noise likeness based on the positive peak value;

a unit for calculating a noise amplitude spectrum gain based on an input amplitude spectrum of the input signal and the noise amplitude spectrum, correcting the noise amplitude spectrum gain with a predetermined first coefficient to obtain a noise amplitude spectrum correction gain, and calculating a noise removal spectrum correction gain based on the input amplitude spectrum of the input signal and the noise amplitude spectrum; and a unit for performing, with respect to the input amplitude spectrum of the input signal, spectrum subtraction based on the noise amplitude spectrum correction gain and spectrum suppression based on the noise removal spectrum correction gain to thereby remove the noise component from the input signal, wherein the determining unit determines the noise amplitude spectrum from the noise-likeness of the input signal.

15. The noise suppression apparatus according to claim 14, wherein the updating rate coefficient determining unit calculates the noise likeness further based on a power of the low pass residual signal for a present frame and a power all over a frequency region of the object signal of the present frame.

16. A noise suppression apparatus, comprising:

a unit for determining noise amplitude spectrum of an input signal;

a unit for analyzing noise-likeness of an input signal including an object signal and noise mixed therein, the analyzing unit performing linear predictive analysis to obtain linear predictive coefficients used to generate a low pass residual signal, and performing correlation analysis on the low pass residual signal, and determining the noise-likeness of the input signal, wherein the correlation analysis generates a position peak value, and the unit for analyzing noise-likeness includes an updating rate coefficient determining unit that calculates noise likeness based on the positive peak value;

a unit for calculating a noise amplitude spectrum gain based on an input amplitude spectrum of the input signal and the noise amplitude spectrum, calculating a noise removal spectrum correction gain based on the input amplitude spectrum of the input signal and the noise amplitude spectrum, and correcting the noise removal spectrum correction gain using a predetermined second coefficient to obtain a noise removed spectrum correction gain;

a unit for performing, with respect to the input amplitude spectrum of the input signal, spectrum subtraction based on the noise amplitude spectrum gain and spectrum suppression based on the noise removal spectrum correction gain to thereby remove the noise component from the input signal, wherein the determining unit determines the noise amplitude spectrum from the noise-likeness of the input signal.

17. The noise suppression apparatus according to claim 16, wherein the updating rate coefficient determining unit calculates the noise likeness further based on a power of the low pass residual signal for a present frame and a power all over a frequency region of the object signal of the present frame.

* * * * *